US011210797B2

(12) United States Patent
Romanik et al.

(10) Patent No.: US 11,210,797 B2
(45) Date of Patent: Dec. 28, 2021

(54) SYSTEMS, METHODS, AND DEVICES FOR IMAGE MATCHING AND OBJECT RECOGNITION IN IMAGES USING TEXTURES

(71) Applicant: Slyce Acquisition Inc., Philadelphia, PA (US)

(72) Inventors: Philip B. Romanik, West Haven, CT (US); Neil Lawrence Mayle, Cambridge, MA (US)

(73) Assignee: Slyce Acquisition Inc., Philadelphia, PA (US)

( * ) Notice: Subject to any disclaimer, the term of this patent is extended or adjusted under 35 U.S.C. 154(b) by 0 days.

(21) Appl. No.: 16/660,544

(22) Filed: Oct. 22, 2019

(65) Prior Publication Data
US 2020/0160543 A1 May 21, 2020

Related U.S. Application Data

(63) Continuation of application No. 15/816,796, filed on Nov. 17, 2017, now Pat. No. 10,510,152, which is a
(Continued)

(51) Int. Cl.
*G06T 7/33* (2017.01)
*G06T 7/73* (2017.01)
(Continued)

(52) U.S. Cl.
CPC ............... *G06T 7/337* (2017.01); *G06K 9/00* (2013.01); *G06K 9/4671* (2013.01);
(Continued)

(58) Field of Classification Search
CPC . G06T 7/337; G06T 7/73; G06T 2207/20021; G06T 2207/10024; G06T 7/0004; G06T 7/33; G06T 5/50; G06K 9/6211; G06K 9/4671; G06K 9/00; G06K 2209/25; G06K 9/6269; G06K 9/6203;
(Continued)

(56) References Cited

U.S. PATENT DOCUMENTS 5,751,286 A 5/1998 Barber et al.
5,893,095 A 4/1999 Jain et al.
(Continued)

OTHER PUBLICATIONS

Flickner et al., "Query by Image and Video Content: The QBIC System," IEEE Sep. 1995 (10 pages).
(Continued)

*Primary Examiner* — Ian L Lemieux
(74) *Attorney, Agent, or Firm* — Innovators Legal

(57) ABSTRACT

A computer-implemented method for determining whether a first image contains at least a portion of a second image includes: determining a first set of feature points associated with the first image; removing from said first set of feature points at least some feature points in the first set that correspond to one or more textures in the first image; and then attempting to match feature points in said first set of feature points with feature points in a second set of feature points associated with said second image to determine whether said first image contains at least a portion of said second image.

22 Claims, 17 Drawing Sheets

TEMPLATE IMAGE          TEST IMAGE

Related U.S. Application Data continuation of application No. 14/745,403, filed on Jun. 20, 2015, now abandoned.

(60) Provisional application No. 62/022,804, filed on Jul. 10, 2014.

(51) Int. Cl.
  *G06K 9/62* (2006.01)
  *G06K 9/46* (2006.01)
  *G06K 9/00* (2006.01)

(52) U.S. Cl.
  CPC .............. *G06K 9/6211* (2013.01); *G06T 7/73* (2017.01); *G06K 2209/25* (2013.01); *G06T 2207/20021* (2013.01)

(58) Field of Classification Search
  CPC ........... G06K 9/00208; G06K 9/00288; G06K 9/00993; G06K 2009/6213; G06K 9/325; G06K 9/46; G06K 9/4633; G06K 9/6256; G06K 9/685; G06K 9/38; G06F 16/51; G06F 3/0481; G06F 8/34; G06F 9/451
  See application file for complete search history.

(56) References Cited

U.S. PATENT DOCUMENTS

| | | | |
|---|---|---|---|
| 6,421,463 B1 | 7/2002 | Poggio et al. | |
| 6,727,925 B1 | 4/2004 | Bourdelais | |
| 6,963,425 B1* | 11/2005 | Nair | G06K 9/4652 358/1.9 |
| 8,732,030 B2* | 5/2014 | Gokturk | G06Q 30/0643 705/26.1 |
| 8,885,984 B1* | 11/2014 | Lavi | G06F 16/535 382/305 |
| 9,740,963 B2* | 8/2017 | Sawhney | G06K 9/00684 |
| 10,109,051 B1* | 10/2018 | Natesh | G06K 9/4652 |
| 2002/0131641 A1 | 9/2002 | Luo et al. | |
| 2010/0104158 A1* | 4/2010 | Shechtman | G06K 9/46 382/131 |
| 2011/0002544 A1* | 1/2011 | Oshima | G06K 9/6211 382/190 |
| 2011/0084964 A1* | 4/2011 | Gould | G06T 15/005 345/426 |
| 2011/0212717 A1* | 9/2011 | Rhoads | G06F 16/9554 455/420 |
| 2012/0134576 A1* | 5/2012 | Sharma | G06K 9/6249 382/155 |
| 2012/0263388 A1* | 10/2012 | Vaddadi | G06F 16/583 382/225 |
| 2013/0308861 A1* | 11/2013 | Cordara | G06K 9/6211 382/170 |
| 2013/0308867 A1* | 11/2013 | Baba | G06K 9/46 382/195 |
| 2015/0003699 A1* | 1/2015 | Davis | G06F 16/248 382/128 |
| 2015/0243032 A1* | 8/2015 | Ely | G06T 7/194 382/103 |
| 2015/0279048 A1* | 10/2015 | Kim | G06K 9/469 382/199 |
| 2016/0342837 A1* | 11/2016 | Hong | G06K 9/46 |
| 2017/0132451 A1* | 5/2017 | Namiki | G06K 9/6254 |
| 2017/0213103 A1* | 7/2017 | Arakawa | G06K 9/527 |

OTHER PUBLICATIONS

Ashley et al., "The Query by Image Content (QBIC) System," IBM Almaden Research Center, SIGMOD 1995 San Jose, USA (1 page).

Marques et al., "Content-Based Image and Video Retrieval," 2002, Springer Science+Business Media New York, USA (189 pages).

"RS/6000 SP" IBM Archives https://ibm.com/ibm/history/exhibits/vintage/vintage_4506v1002 . . . (1 page).

Barber et al, "The QBIC Project: Querying Images by Content, Using Color, Texture, and Shape," Conference Paper in Proceedings of SPIE—The International Society for Optical Engineering—https://www.researchgate.net/publication/220979865 Jan. 1993 (16 pages).

"Final Claim Constructions of the Court" *Slyce Acquisition Inc.* v. *Syte—Visual Conception Ltd. and Kohl'S Corporation*—Civil Action No. 6:19-CV-257-ADA—in the United States District Court for the Western District of Texas Waco Division—May 8, 2020 (7 pages).

\* cited by examiner

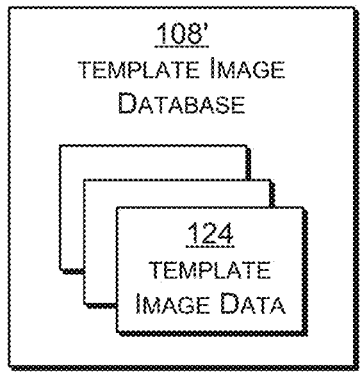
FIG. 2(A)
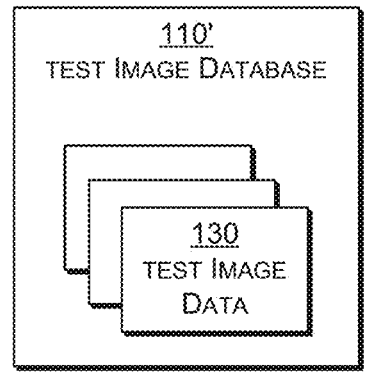
FIG. 2(C)
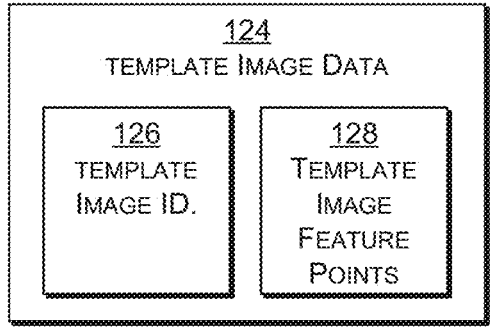
FIG. 2(B)
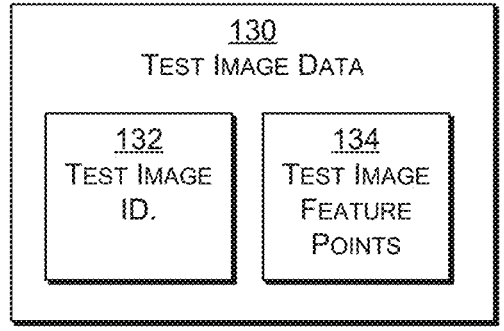
FIG. 2(D)
| IMAGE FEATURE POINTS | | |
|---|---|---|
| INDEX | LOCATION IN IMAGE (POSITION, SCALE, AND ROTATION) | DESCRIPTOR |
| 0 | L0 | D0 |
| 1 | L1 | D1 |
| . . . | . . . | . . . |
| K-1 | $L_{K-1}$ | $D_{K-1}$ |
FIG. 2(E)

| 136 Match Image Data |||
|---|---|---|
| 138 Test Image ID. | 140 Template ID. | 146 Number of feature points in Template |
| 148 Match Set |||

| 148' MATCH SET | | |
|---|---|---|
| TEMPLATE POINT | TEST POINT | DISTANCE |
| P1 | P'1 | D1 |
| P2 | P'2 | D2 |
| ⋮ | ⋮ | ⋮ |
| P$_N$ | P'$_N$ | D$_N$ |

| Composite Feature Points ||
|---|---|
| Template Image | Composite Feature Points |
| TI1 | CFP1 |
| TI2 | CFP2 |
| ⋮ | ⋮ |
| TI$k$ | CFP$k$ |

FIG. 2(J)

SYSTEMS, METHODS, AND DEVICES FOR IMAGE MATCHING AND OBJECT RECOGNITION IN IMAGES USING TEXTURES

RELATED APPLICATIONS

This application is a continuation of co-pending application Ser. No. 15/816,796 filed Nov. 17, 2017, which is a continuation of Ser. No. 14/745,403, filed Jun. 20, 2015, which claims the benefit of U.S. Provisional Application No. 62/022,804, filed Jul. 10, 2014, the entire contents of each of which are hereby fully incorporated herein by reference for all purposes.

COPYRIGHT STATEMENT

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to image processing, and, more particularly, to enhanced techniques for image matching and object recognition in images.

INCORPORATION BY REFERENCE

The entire contents of each of the following eight (8) co-owned U.S. patent applications are hereby fully incorporated herein by reference for all purposes:

|    | application Ser. No. | Filing Date    |
|----|----------------------|----------------|
| 1. | 62/022,592           | Jul. 9, 2014   |
| 2. | 62/022,619           | Jul. 9, 2014   |
| 3. | 62/022,651           | Jul. 9, 2014   |
| 4. | 62/022,636           | Jul. 9, 2014   |
| 5. | 14/745,353           | Jun. 19, 2015  |
| 6. | 14/745,363           | Jun. 19, 2015  |
| 7. | 14/745,393           | Jun. 20, 2015  |
| 8. | 14/745,397           | Jun. 20, 2015  |

BACKGROUND

Image processing techniques exist for trying to determine whether one image is present in another image. More specifically, techniques exist for trying to determine whether one or more objects in one image are present in another image. Such object recognition/identification/location techniques vary in speed and accuracy, but do not scale well to real time and on-the-fly processing of multiple images.

It is desirable to provide object recognition/identification/location image processing techniques that improve the speed and/or accuracy of such techniques. It is further desirable to provide image processing techniques for object recognition/identification/location that support and scale to accurate real-time, on the fly, and batch processing of multiple images.

BRIEF DESCRIPTION OF THE DRAWINGS

Other objects, features, and characteristics of the present invention as well as the methods of operation and functions of the related elements of structure, and the combination of parts and economies of manufacture, will become more apparent upon consideration of the following description and the appended claims with reference to the accompanying drawings, all of which form a part of this specification.

FIGS. 2(a)-2(j) show aspects of databases and data structures used by the system of FIG. 1, according to exemplary embodiments hereof;

DETAILED DESCRIPTION OF THE PRESENTLY PREFERRED EXEMPLARY EMBODIMENTS

Glossary and Abbreviations

Figure 1:
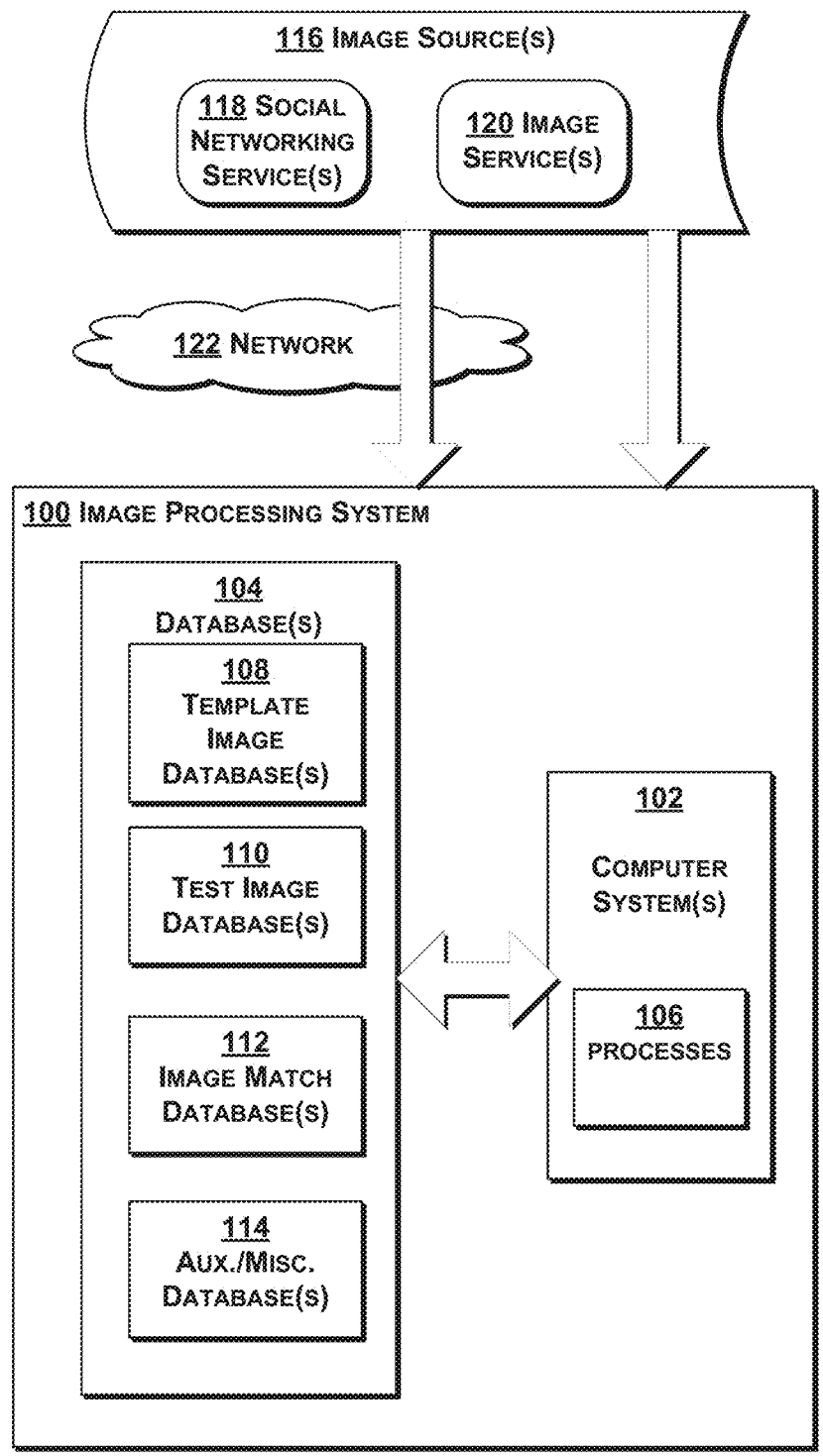
FIG. 1 depicts an overview of a system according to exemplary embodiments hereof.

As used herein, unless used otherwise, the following terms or abbreviations have the following meanings:

FLANN means Fast Library for Approximate Nearest Neighbors;

GLOH means Gradient Location and Orientation Histogram;

MSER means maximally stable external regions;

PCA-SIFT means Principal Components Analysis SIFT;

RANSAC refers to RANdom SAmple Consensus;

SIFT means Scale-Invariant Feature Transform;

SURF means Speeded Up Robust Features;

SVM means support vector machine; and a "mechanism" refers to any device(s), process(es), routine(s), service(s), or combination thereof. A mechanism may be implemented in hardware, software, firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may thus be considered to be shorthand for the term device(s) and/or process(es) and/or service(s).

BACKGROUND

The process of matching feature points between a first image and a second image becomes increasingly difficult in the presence of features such as noise, texture, and repeating patterns in the images. When one image is a template image, typically an idealized representation of a pattern or object, the goal is to find where the template image is located in a second image. When matching two images against their entirety, these complicating features can cause a valid match between a template image and test image to be missed (i.e. false negative match), or can cause incorrect (i.e. false positive) matches to be found.

One complication originates from noise in the test image. This noise may be caused by a multitude of sources, and includes quantization during image compression as well as image sensor noise, especially in images acquired in low-light environments. Image noise complicates the matching process because the feature points can look radically different from their expected values, causing feature points to appear similar to feature points in other template images. A common solution to this problem is to blur the image to reduce the impact of noise. However, the amount of blurring necessary to remove all image noise can limit the ability of the image to be matched against a template image.

Another complication is caused by texture in an image. As used herein, texture may be considered to comprise related, but different patterns found in an image. For example, an image of grass, trees, or sky can look like a small set of patterns duplicated over a region in the image. When viewed at the pixel level, the patterns contain as much noise as they do a repeating texture. A special class of texture is text. For example, when images are posted on social media, they often contain overlay text or caption text. Text influences the features in an area surrounding the text, and this makes it more difficult to match features in these regions to a template image.

Another complication arises when repeating objects are found in an image. If a feature described by a template image is found in multiple positions in an image, it is not uncommon for a match between a template image and a test image to comprise portions from multiple instances of the object. It is possible that this type of composite match can pass validation steps designed to insure that only real matches between a template image and test image are identified. In actuality, this is a not a match (i.e. a false positive match) and using this image for purposes or improving the detection process can hurt the ability to find a template image in other test images.

DESCRIPTION

As shown in FIG. 1, an image processing system 100 according to exemplary embodiments hereof includes one or more computer systems 102 operatively connected to one or more databases 104. Processes 106 running on the computer system(s) 102 interact with the databases 104 as described herein.

The database(s) 104 preferably include one or more template image databases 108, one or more test image databases 110, one or more image match databases 112, and one or more auxiliary/miscellaneous databases 114, each described in greater detail below. The one or more template image databases 108 may also be referred to herein as template image database(s) 108. Similarly, the one or more text image databases 110 may also be referred to herein as text image database(s) 110; and the one or more image match databases 112 may also be referred to herein as image match database(s) 112. The various databases may be implemented in any known manner, including as a file system in an operating system, and the system is not limited by the manner in which any particular database is implemented or maintained or accessed. There is no requirement for the databases to be implemented in the same manner. The database(s) 104 may be co-located with each other and/or with the computer system(s) 102, or they may be remotely located. The database(s) may be distributed.

The image processing system 100 obtains images from one or more image sources 116 (also referred to as image source(s) 116), which may include one or more social networking services 118 (e.g., Facebook, Twitter, and the like) and other image generating or providing services 120. The image processing system 100 may obtain the images via a network 122 (e.g., the Internet) and/or in some other manner. It should be appreciated that the image processing system 100 may obtain images from different image sources in different manners. In some cases the image source(s) 114 may be co-located or be part of the image processing system 100. For example, the image source(s) 114 may comprise image storage on the image processing system 100.

With reference now to FIG. 2(a), an exemplary template image database 108' may contain template image data 124 for multiple template images. As used herein, a template image refers to an image that is to be looked for in other images. A template image may be any image, including one or more of: a logo, a face, textual information, etc. A template image may be fully or partially machine generated. The system is not limited by the content of template images or the way in which they are generated, obtained, or stored.

Figures 2F, 2G:
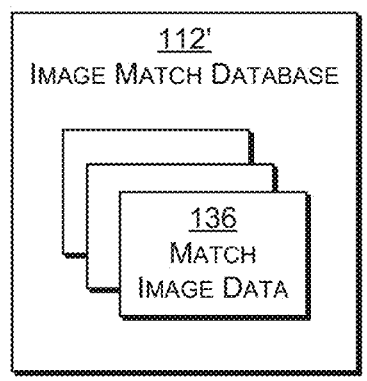
Figure 3A:
FIGS. 3(a)-3(e) show exemplary processing in the system of FIG. 1, according to exemplary embodiments hereof.

The template image data 124 for a particular template image may be generated in an offline process, as shown, e.g., in FIG. 3(a), in which a template image 300 is processed by an initial setup mechanism 302 to produce template image data 124 corresponding to the template image 300. Preferably each template image is uniquely identifiable within the system, and, as shown in FIG. 2(b), exemplary template image data 124 may include a template image identifier 126 and template image feature points 128 (e.g., generated by the initial setup mechanism 302). A copy of each template image is preferably also maintained in database(s) 104, preferably in template image database(s) 108, and each template image is preferably accessible in the database(s) 104 using its corresponding template image identifier 126.

Features are locations within the image within an image that can be used by a matching algorithm to try to find instances of a template image in a test image. The features may also include a description of the image at or near that point. Feature points are preferably picked in such a way that the equivalent locations will also be picked if the image is transformed in various ways (e.g., lighting changed, rotated, scaled, tilted). The feature descriptors are preferably designed to be invariant across a various transformations to the image.

As shown in FIGS. 2(c)-2(d), an exemplary test image database 110' contains test image data 130 for multiple test images. As noted above, test images may be obtained, e.g., from image source(s) 116. Once obtained by the system 100 images are preferably assigned a unique test image identifier 132 and are stored in test image data 130 the test image database(s) 110 associated with the test image identifier 132. It should be appreciated that it is preferable to store a copy of the test image in the test image database(s) 110. Once a test image has been processed (as described in greater detail herein), the test image data 130 associated with the test image may include test image feature points 134.

The image feature points (template image feature points 128, FIG. 2(b) and test image feature points 134, FIG. 2(d)) may be stored in an image feature points structure, such as the exemplary logical structure shown in FIG. 2(e). Assuming there are k image feature points for a particular image, the logical structure includes an index (0 to k−1) for the feature point, a location in the image (e.g., a pixel) associated with the feature point, and a descriptor of the feature point. The form of the descriptor will depend on the feature extraction algorithm used, as described in greater detail below. In a present implementation the feature descriptors are SIFT descriptors. Those of ordinary skill in the art will realize and appreciate, upon reading this description, that different and/or other descriptors may be used. For example, the feature descriptors may be SURF or PCA-SIFT or GLOH descriptors. PCA-SIFT is described, e.g., in Yan Ke and Rahul Sukthankar. 2004, *"PCA-SIFT: a more distinctive representation for local image descriptors,"* in Proc. of the 2004 IEEE Computer Society Conference on Computer Vision and Pattern Recognition (CVPR'04), IEEE Computer Society, Washington, D.C., USA, 506-513, the entire contents of which are hereby fully incorporated herein by reference for all purposes. GLOH descriptors are described, e.g., in Krystian Mikolajczyk and Cordelia Schmid "A performance evaluation of local descriptors," IEEE Transactions on Pattern Analysis and Machine Intelligence, 10, 27, pp. 1615-1630, 2005, the entire contents of which are hereby fully incorporated herein by reference for all purposes. SURF descriptors are described, e.g., in Herbert Bay, Andreas Ess, Tinne Tuytelaars, Luc Van Gool, "SURF: Speeded Up Robust Features," Computer Vision and Image Understanding (CVIU), Vol. 110, No. 3, pp. 346-359, 2008, the entire contents of which are hereby fully incorporated herein by reference for all purposes.

In a presently preferred exemplary implementation the features are detected using an image pyramid of Laplacian-filtered images to locate one set of features for the whole image. Those of ordinary skill in the art will realize and appreciate, upon reading this description, that different and/or other approaches to feature detection may be used. For example, in some alternate approaches features may detected using SIFT or MSER, or feature sets may be found for interesting regions of the test image and each region can be matched separately.

Feature detection may find hundreds of features for the template image and similarly, hundreds of features for the test image.

Those of ordinary skill in the art will realize and appreciate, upon reading this description, that any data structures shown herein are merely examples, and that different and/or other data structures and organizations may be used.

FIG. 2(f) shows an exemplary image match database 112' containing match image data 136 for one or more (preferably multiple) images.

Figure 3B:
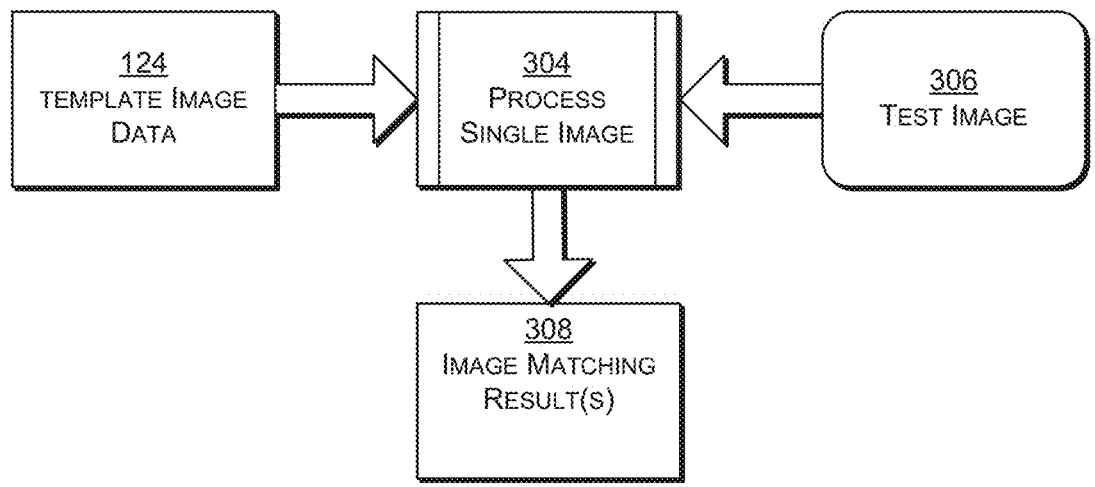

As shown in FIG. 3(b), in operation, the image processing system 100 may process a single test image 306 (at 304) with respect to particular template image data 124 to determine whether or not the template image corresponding to the template image data 124 is present in the single test image 306. If a match is found, i.e., if the process single image mechanism 304 determines with sufficient certainty that the template image corresponding to template image data 124 is present in the image 306, then the process produces image-matching results 308. The image matching results 308 may include an indication of where the template image is located in the single image 306 and may also include other information about the match. The image matching results 308 may be stored, e.g., in match image data records 136 in the image match database(s) 112.

Figure 6A:
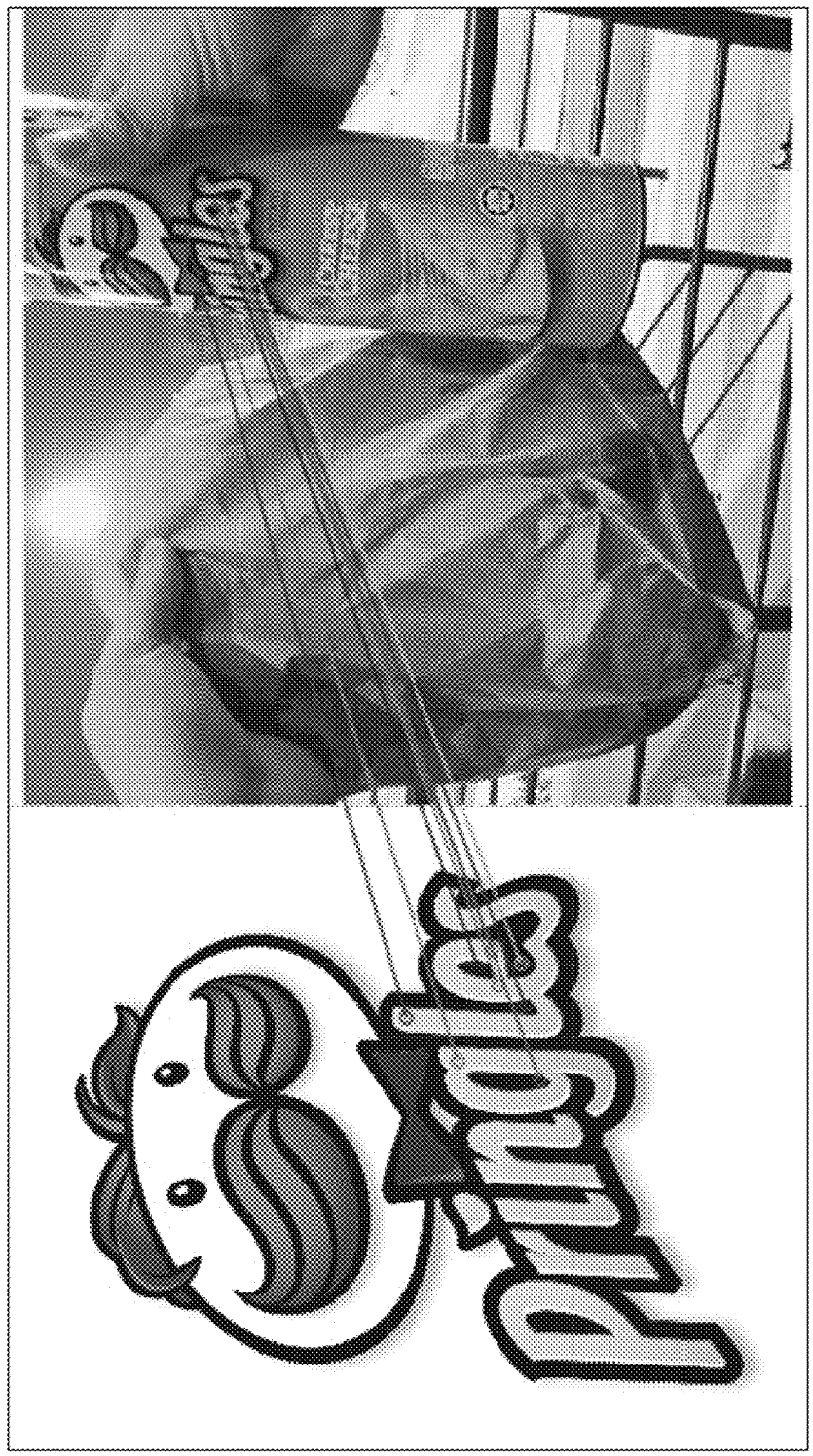
FIGS. 6(a)-6(d) show examples of the matching one or more portions of a template image to a test image.
Figure 6B:
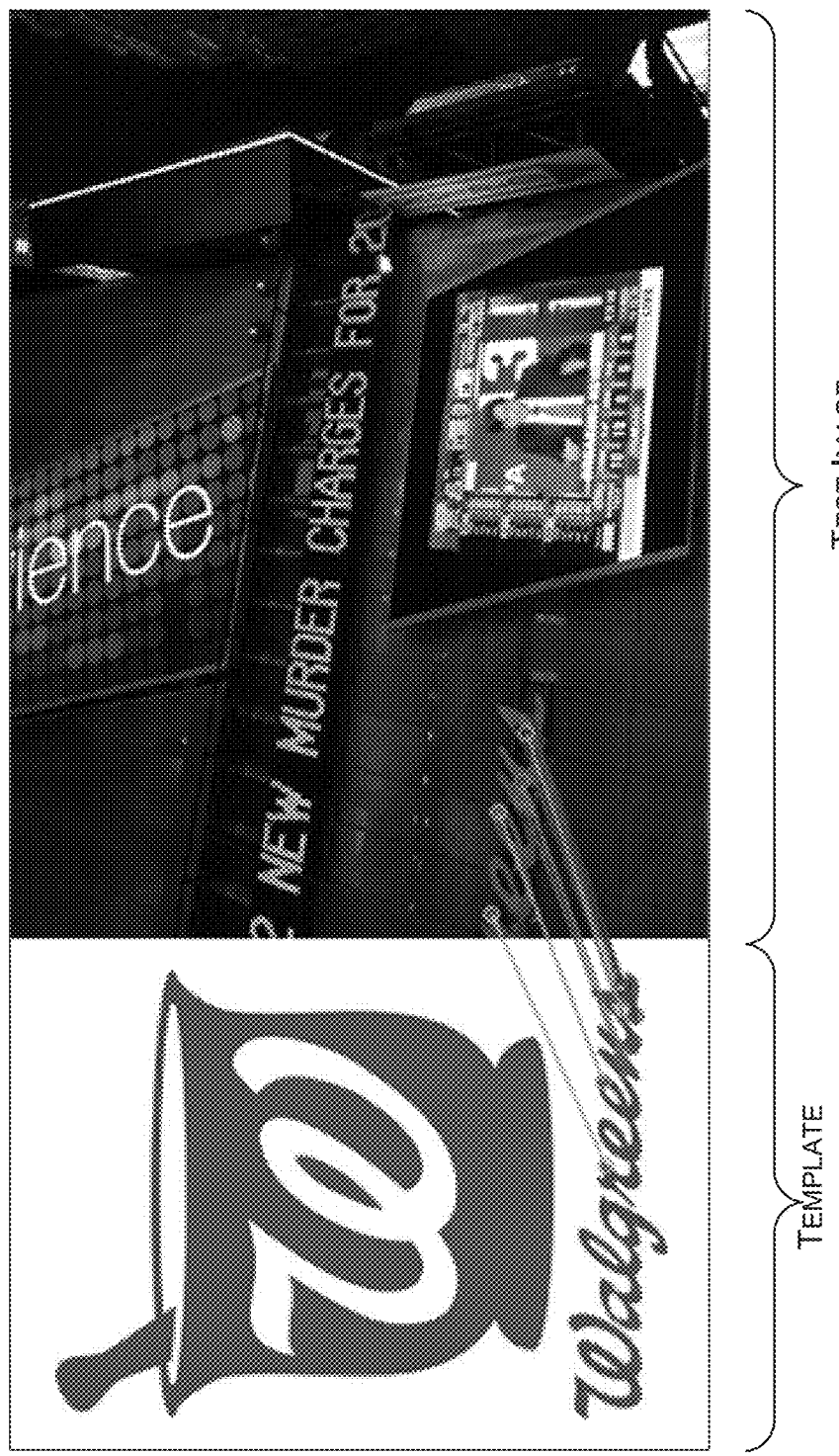
Figure 6C:
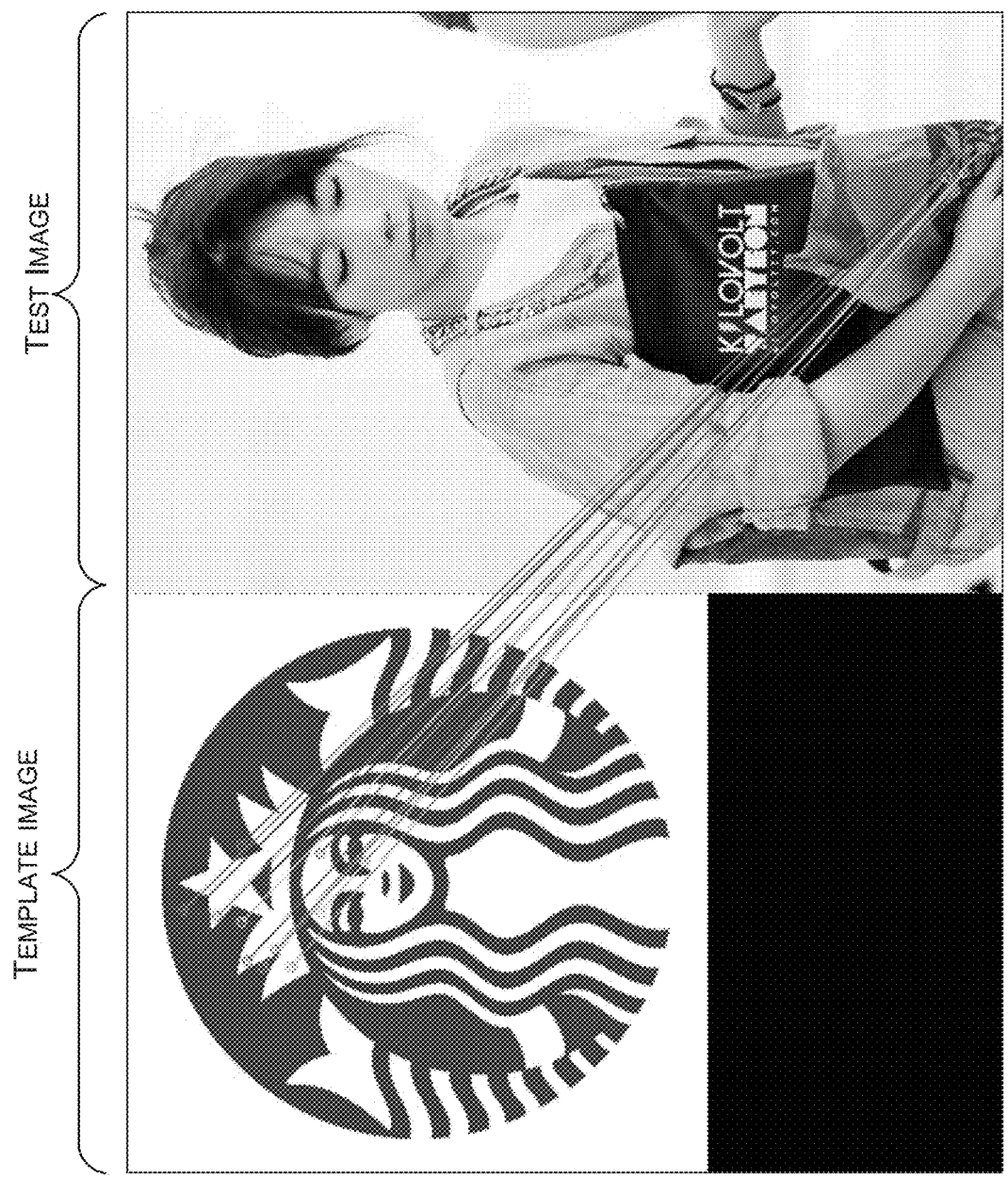
Figure 6D:
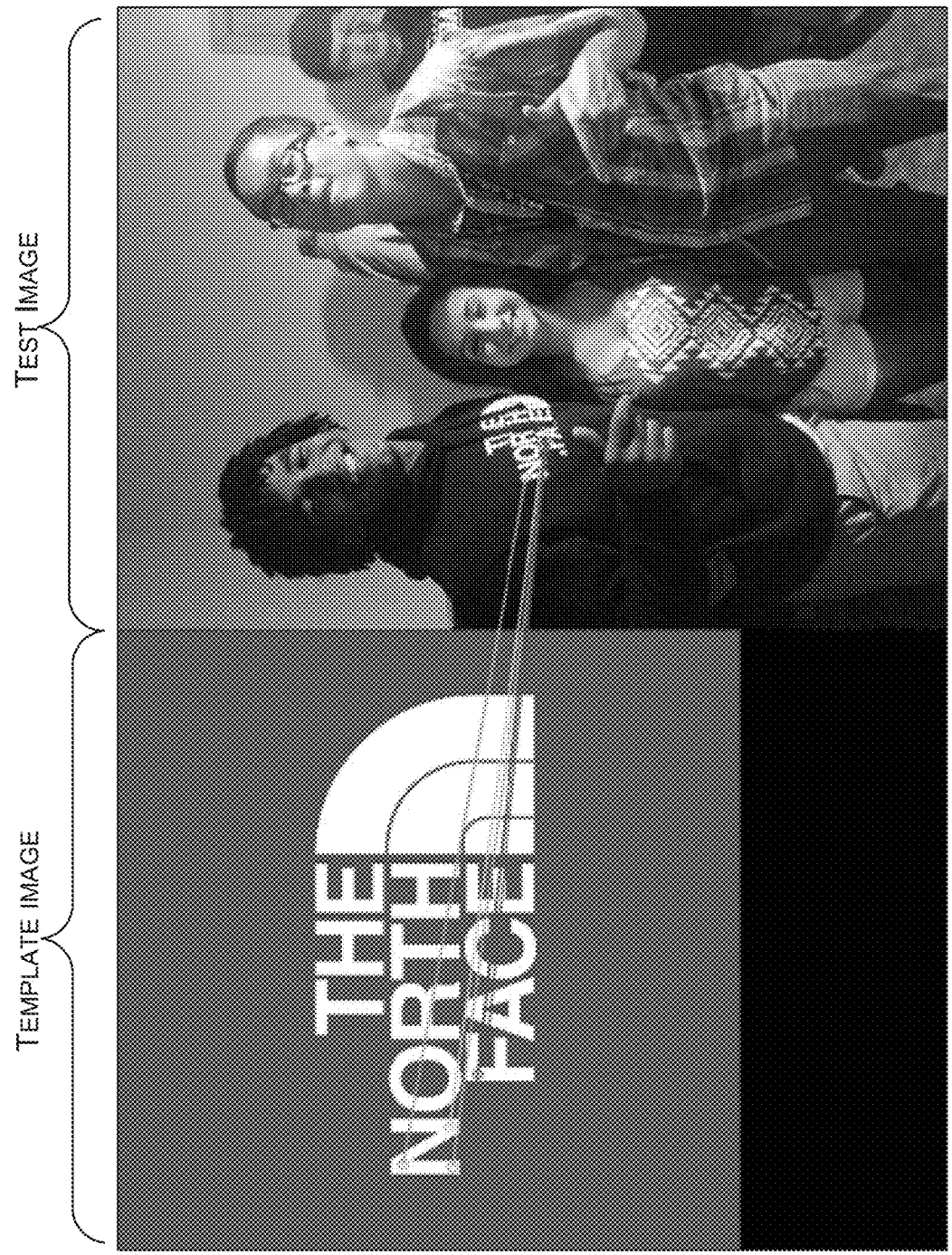

As used herein, a template image is considered to be present in a test image if at least some portion of the template image is in the test image. It should be appreciated and understood that it is not necessary that the entire template image be in the test image in order for the template to be in the test image (see, e.g., FIGS. 6(a)-6(c)), nor is it necessary for the portions of the template that are in the test image to be contiguous or uninterrupted in the test image (see, e.g., FIG. 6(d), where non-contiguous parts of the template image are in the test image).

Matching is done between features of the template images and the features of the test image, and the matching process finds feature points that correspond between the two images. Two feature points are considered to correspond/match if the descriptions of the two feature points are similar enough. A similarity measure (e.g., a distance) is used between the two points and if the distance is within some limit the two feature points are considered to be matches. The results of the matching process between a template image and a test image is a set of pairs of feature points called the match set. The first element of the pair is a feature of the template image and the second element of the pair is a feature of the test image. Associated with each pair of features is a measure of the similarity of the two features.

In presently preferred exemplary embodiments hereof, as shown e.g., in FIG. 2(g), in some modes, the match image data 136 may include: (i) a test image identifier 138 (corresponding to the unique identifier of the matched test image in the system); (ii) a template image identifier 140 (corresponding to the unique identifier of the matched template image in the system); (iii) the number of feature points in the template 146; and (iv) a match set 148. It should be appreciated that some of these fields may not be present or used in all embodiments hereof.

Figures 2H, 2I:
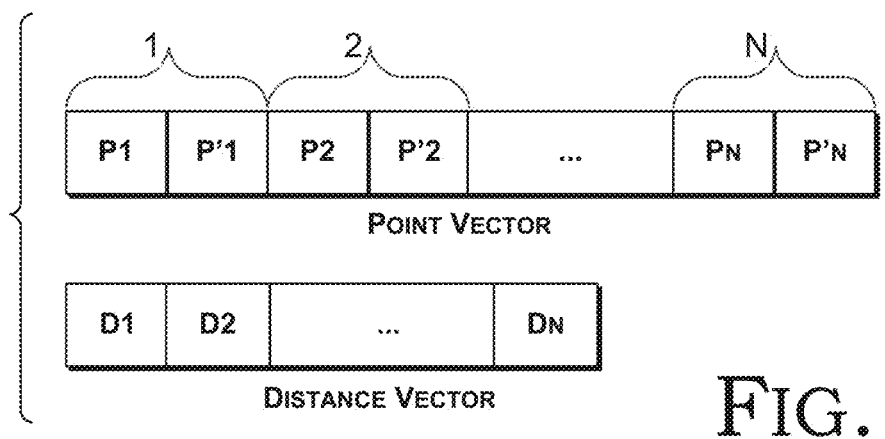

An exemplary match set (which may be part of the match image data 136) preferably includes a list of matched points from the template image and the test image, along with the distance between them. Thus, e.g., the exemplary match set 148' in FIG. 2(h) includes N matches $(P_1, P'_1), (P_2, P'_2), \ldots (P_N, P'_N)$, with corresponding distances $D_1, D_2, \ldots D_N$. In this example, according to the matching algorithm, point $P_i$ in the template image matches or corresponds to point $P'_i$ in the test image, for i=1 to N, where $D_i$ is a distance for points $P_i$ (in the template image) and $P'_i$ (in the test image). In some implementations a match set 148 may be stored as a point vector comprising pairs of matched points along with a distance vector of the corresponding distances.

Figure 3C:
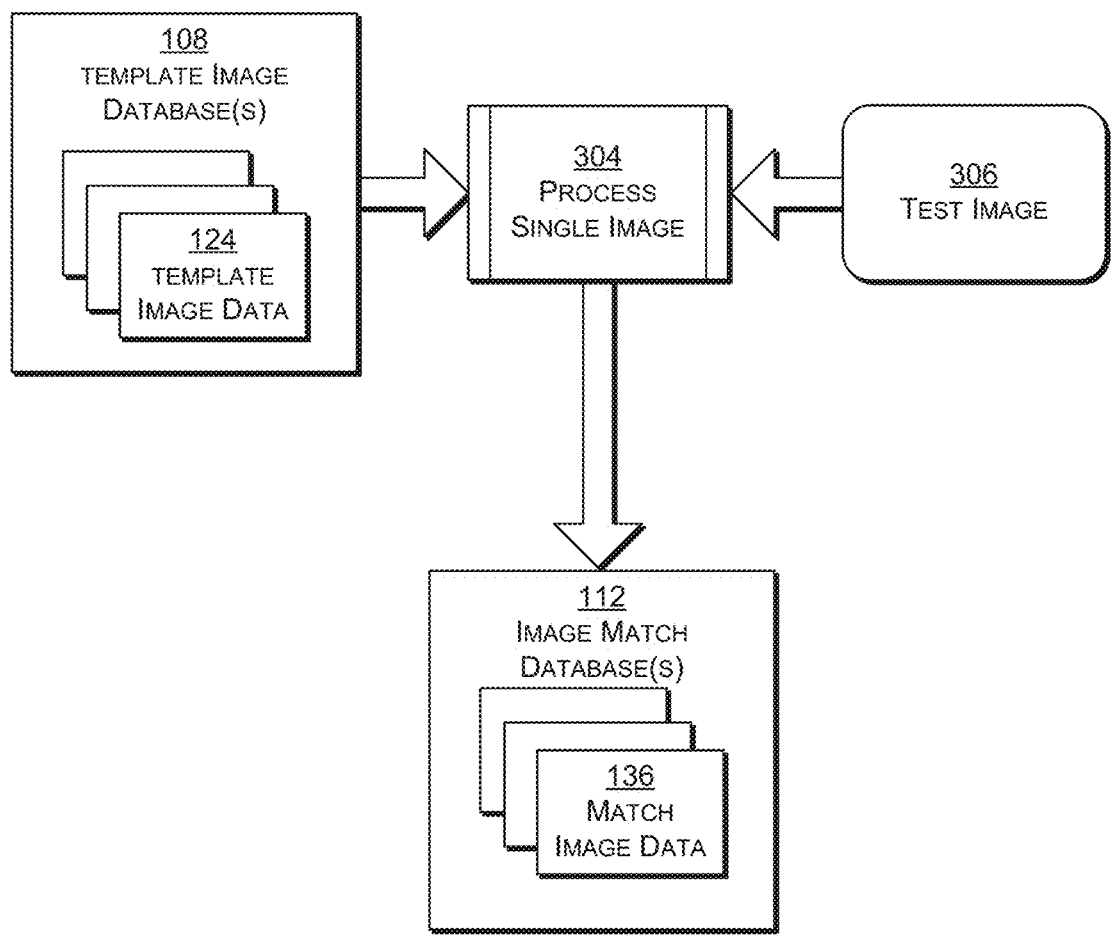

As shown in FIG. 3(b), the mechanism 304 attempts to match a single template image with a single test image. However, in operation, a system 100 may attempt to match a particular test image with multiple template images, as shown, e.g., in FIG. 3(c). The mechanism 304 (to process a single test image with respect to a single template image) may thus be invoked repeatedly for multiple template images whose template image data 122 are stored in the template image database(s) 108. In some exemplary embodiments the routine 304 may terminate when a match is found for a template image. In other embodiments the mechanism 304 may continue to look for other matches (e.g., with other template images) even after a match is found.

Figure 3D:
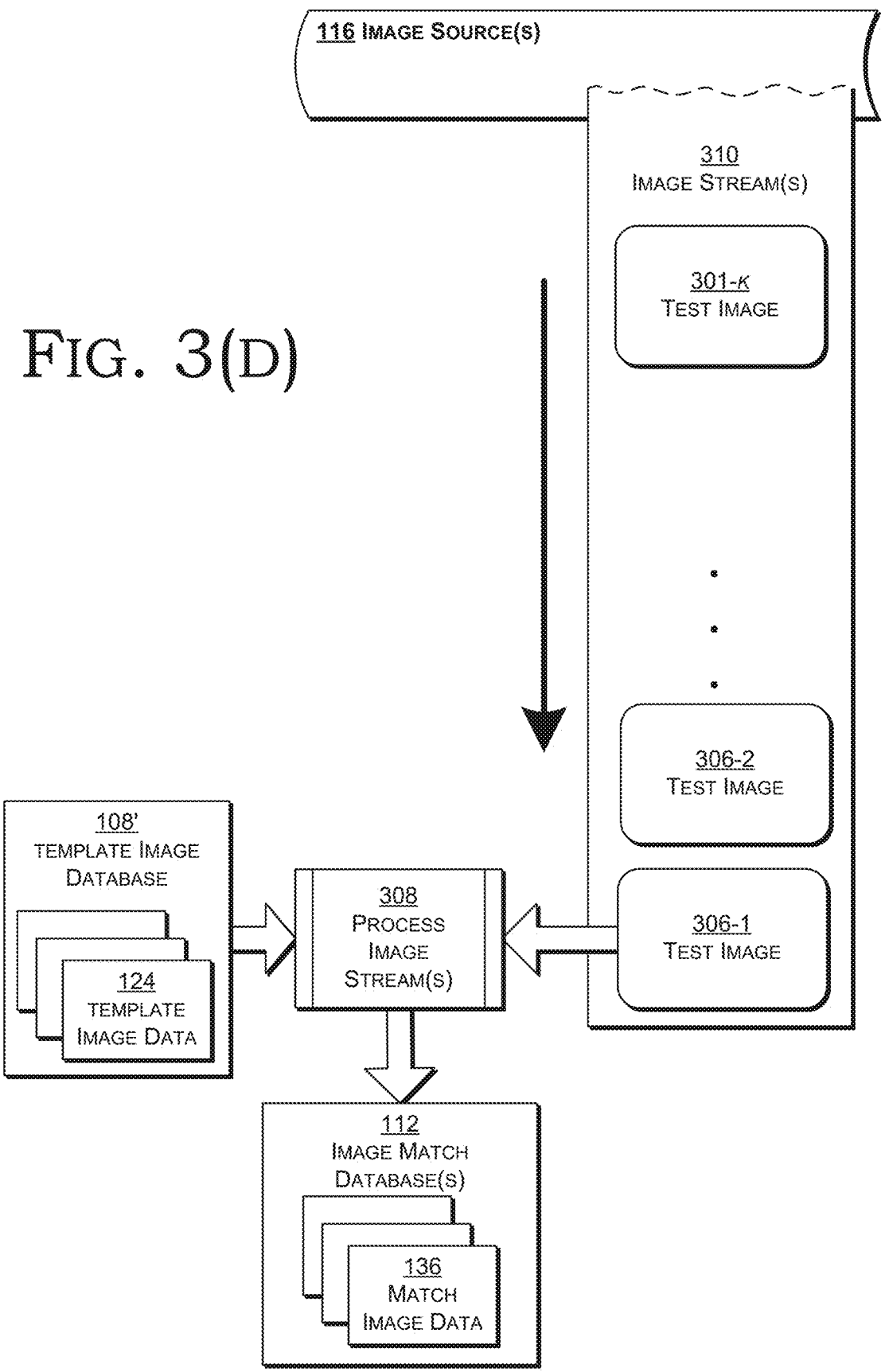
Figure 3E:
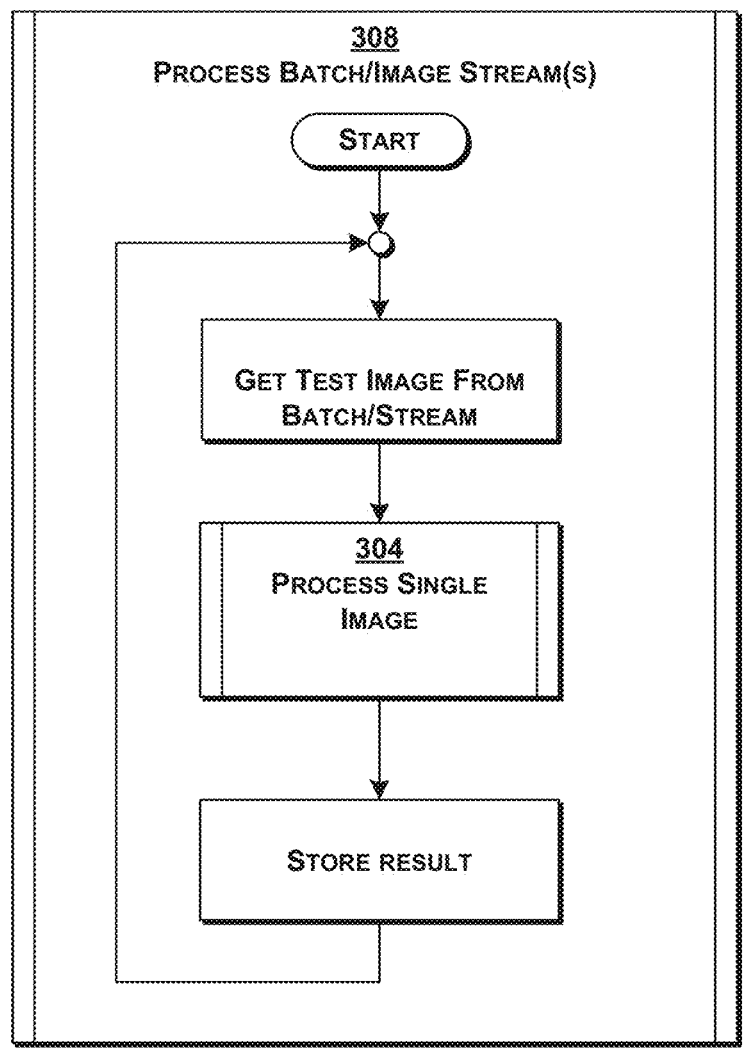

As shown above with reference to FIG. 1, image-processing system 100 may obtain test images from image source(s) 114. These test images may be obtained in a batch and/or as one or more streams of images 310. For example, there may be a stream of images corresponding to each image source. With reference to FIGS. 3(d)-3(e), the process image stream(s) mechanism 308 processes the images 306 in image stream(s) 310 (from the image source(s) 114) to determine whether one or more template images match images in the image batch/image stream(s) 310. In some embodiments this process may be implemented by repeatedly invoking the process single image mechanism 304 for images in the image stream(s) to determine whether any template images match the image stream images.

The mechanisms (process single image, process image stream(s), etc.) may correspond to processes 106 running on the computer system(s) 102.

In some real-world system, the image streams may contain millions of images, produced at a rate exceeding 2 million images per day (about 1,400 images per minute).

Processing a Single Image

An exemplary mechanism to process a single image (corresponding to 304 in FIGS. 3(*b*) and 3(*c*)) is described in David G. Lowe, "Distinctive Image Features from Scale-Invariant Keypoints," Int. J. Comput. Vision 60, 2 (November 2004), 91-110, hereinafter "Lowe", and in U.S. Pat. No. 6,711,293, to Lowe, the entire contents of both of which are hereby fully incorporated herein by reference for all purposes. Lowe's technique is sometimes referred to as SIFT.

An image may be decomposed into a number of feature points to describe the visual content of the image. Feature points may be generated at predetermined locations (i.e., at a certain position, and radius) in an image, or computed from features found in an image. When feature points are chosen that are invariant to change (such as to translation or rotation), these feature points may be used to determine whether two images are related to each other.

For example, if two photographs are taken of the same scene from slightly different vantage points, each image will contain similar features in the overlap region between the images. When the feature points from each image are compared, it is possible to determine if the two images are related, and the coordinate transformation of how they are related.

Feature point matching may also be used to see if a template is found in an arbitrary image. A template may be a real or an artificial image that expresses a pattern to be found in the image. The template may be any image, including a computer generated brand logo. In this case, the matching operation can determine if the brand logo is present in a second image, and if so, where in the second image the brand logo is located.

Matching a template against an image generally includes a number of steps, namely:
1. Feature point extraction from the template image.
2. Feature point extraction from a test image.
3. Match feature points from template image with feature points in a test image.
4. Match feature points in a test image with the feature points from the template image.
5. Eliminate non-symmetrical matches.
6. Compute the best image transformation between the matching points.
7. Determine if the template image is present in the test image.

Feature Point Extraction

There are many feature detectors that may be used to implement the feature point extraction of the first two steps, including ones such as SIFT (Scale-Invariant Feature Transform), and SURF (Speeded Up Robust Features) that can detect features which are scale and rotationally invariant.

Feature point extraction from an image consists of two steps. The first step is to determine positions in the image that are stable (i.e., that do not move) over small and moderate amounts of image transformation such as scale and rotation. These locations define so-called keypoints in the image. A keypoint describes a two-dimensional (2D) location (e.g., (x, y) coordinates) and the angle (or orientation) of the feature (SIFT keypoints specify a 2D location, scale, and orientation).

The second step of feature point extraction is to extract a so-called descriptor (e.g., a numeric signature) from each feature point. For example, an implementation of the SIFT descriptor has 128 values that encapsulate the orientations in a region that surrounds the keypoint. Numeric descriptor values are often normalized such that the descriptor is of unit length. This normalization improves the descriptors invariance to illumination changes.

It should be appreciated that steps 1 and 2 generally differ as to when the feature point extraction is computed. Typically the template image is known in advance and the feature point information can be constructed beforehand. Feature point extraction of a test image may be computed when the image is analyzed, and compared with the previously computed information from the template image.

Matching Feature Points

The third and fourth steps match (or attempt to match) feature points from one image to feature points from another image. This matching may be accomplished, e.g., by computing the nearest neighbors of each descriptor from a first image to descriptors in a second image. Descriptors come in many varieties ranging from binary (one-bit of information) to numeric for each element in the descriptor. For numeric descriptors, the nearest neighbors may be determined by the descriptors with the shortest distance. Although many distance formulas can be used, the L2 (Euclidean) distance is preferred. For each descriptor in one image, the closest matches (usually two) from the second image are computed.

Lowe describes a ratio test that computes the ratio of the smallest distance from a keypoint in a first image to a keypoint in a second image, to the second smallest distance from the same keypoint in the first image to a second keypoint in the second image. A large ratio (Lowe used a threshold of 0.8) may be used to indicate that two keypoints in the second image are similar to the keypoint in the first image. When this condition arises, there is no matching keypoint in the second image to the keypoint in the first image. This process is carried out by comparing every keypoint in one image to the keypoints in the second image.

The third and fourth steps differ in the direction of matching. In the third step the keypoints from the template image are compared with the keypoints in the test image. In the fourth step the keypoints in the test image are compared with the keypoints in the template image.

Eliminating Non-Symmetrical Matches

The fifth step enforces a constraint that the best matching points between a first image and a second image should be the best matching points between the second image and the first image. This symmetric matching step discards the matches found in the third and fourth step if the best matches do not refer to each other.

Computing the Best Image Transformation Between the Matching Points

The sixth step takes as input the keypoints from the template image that match the keypoints in the test image, and computes a geometric relationship between the points in each image. Many different methods can be employed to determine these relationships, including using a Hough transform (see, e.g., Lowe), affine transformation, or homography. A homography computes the projective transform to describe the relationship between two coordinate systems. The points determined from the fifth step do not necessarily share the same geometric transformation. One reason is that the points come from different, non-related, portions of the image. Another reason is that points belong to related objects, but the objects are grossly distorted. The RANSAC (RANdom SAmple Consensus) algorithm may be employed to find the best subset of matching points to compute the best transformation between two images. The RANSAC algorithm is described in Fischler, M. A., et al (June 1981), "Random Sample Consensus: A Paradigm for Model Fitting with Applications to Image Analysis and Automated Cartography," Comm. of the ACM 24 (6): 381-395, the entire contents of which are hereby fully incorporated herein by reference for all purposes.

Determining if the Template Image is Present in the Test Image

The seventh step identifies whether the template image is present anywhere in the test image. The result of the sixth step is either: (i) no homography (insufficient matching points exist between the template image and test image), (ii) an incorrect homography, or (iii) a valid homography.

An invalid homography is one in which the matching points between the template image and test image returns a mathematically valid result, but one which is impossible in the natural world. Invalid homographies are treated as though no homography was computed.

A valid homography is used to establish the coordinate system relationship between points in the template image with the points in the test image. However, the homography might be valid only over a small region of the image, rather than over the entire area of the template image. In some cases this is acceptable if the template in the test image is obscured or distorted. In other cases, the matching region may be small because the template image is not found in the test image. For example, a portion of a letter in the template image may match the corresponding letter in the test image. This does not mean that the template image is present in the test image, only that they share a small common region. One common method to determine if the template image is present in the test image is to define a minimum overlap size between the template image and test image. A match between the template image and test image is returned only if the overlap area exceeds this threshold.

Figure 7:
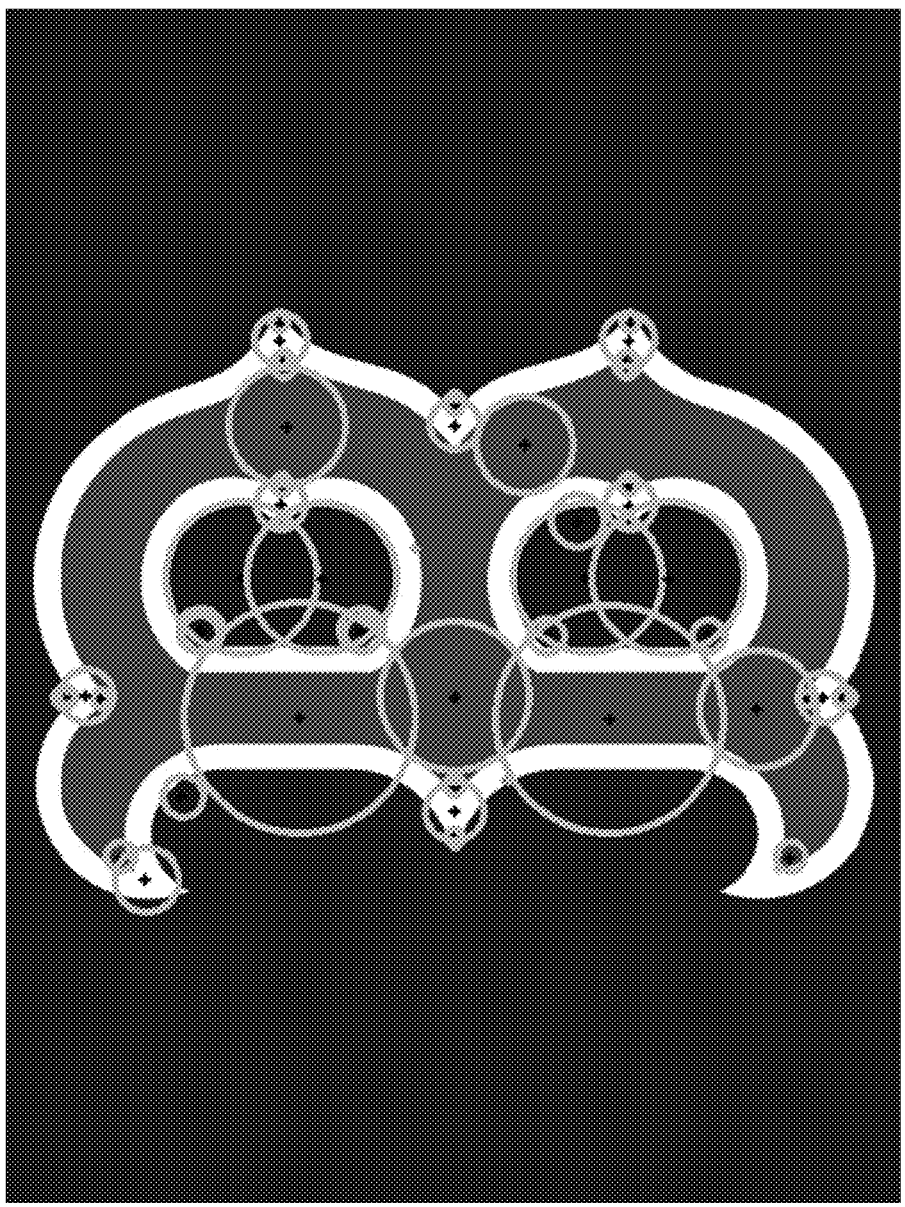
FIG. 7 shows the SIFT-like feature points overlaid on an image.

Image Matching and Object Recognition in Images Using Feature Point Localization Summary In one aspect hereof, the impact of texture may be reduced by looking for repeating patterns in the image using techniques including feature point similarity and correlation. Given the feature points found in a test image, the feature descriptors may be matched against each other to find similarities in the image. If there is sufficient similarity in an area of the image, either the specific areas, of the entire area, may be eliminated from feature point matching. Some template images (e.g., the template image in FIG. 7) contain repeating patterns. FIG. 7 shows the SIFT-like feature points overlaid on an image, identifying the center of each feature point as a small cross and the size as a circle centered on each feature point. The symmetrical regions of this image have feature descriptors that are identical, or nearly identical. To prevent patterns like this from being eliminated, preferred embodiments hereof require a minimum number of similar feature points before a region of the image is excluded from further consideration during matching. Another approach to detecting similar regions in an image is using normalized correlation. A small window may be used to describe a model and similar looking regions in the image that appear similar to the model may be identified. One approach may use "Registering an Image Using Normalized Cross-Correlation," described in MathWorks documentation at http://www.mathworks.com/help/images/examples/registering-an-image-using-normalized-cross-correlation.html, the entire contents of which are hereby fully incorporated herein by reference for all purposes. Unlike the use of feature descriptors to find duplicate regions, many models must be created to find the right size and scale to describe the texture. A composite method may be used, whereby the location and size of feature points are used to determine the correlation models. When many correlation peaks are found for a given model, the assumption is made that these regions describe the same texture and may be eliminated from further processing.

In another aspect hereof, an optional feature point filter identifies feature points that potentially may be matched to a template image and should be included during matching. This filter also identifies feature points that are not associated with any feature in any template image. The elimination of points from matching improves the accuracy of the match and reduces the amount of time required to match the points from a test image to a template image. One method to discard points from matching is using K-means clustering or a Support Vector Machine (SVM) using a known dataset of feature points that match a set of template images and feature points that do not match a set of template images. Training a classifier to reject feature points takes into consideration the uniqueness and number of feature points in a template image. When a template image contains a large number of feature points, it is acceptable if a small fraction of valid matching points is discarded as long as a large number of non-matching points are discarded as well. In preferred embodiments hereof, only points that are considered far away from the cluster centers are discarded from matching in order to reduce the chances that valid match points are discarded.

In another aspect hereof, one or more candidate filters may be employed to convert the global set of feature points in a test image into a number of possibly smaller sets of feature points, whereby each set of feature points is matched independently to one or more template images. The matching of a test image to a template image may be exhaustive (i.e. every template image is matched to a test image), or may be a list of specific template images that might be expected in each region. An advantage of matching a template image to a sub-region of a test image is that texture and duplicate features from outside the sub-region have no impact on the matching. It should be appreciated that the quality of the matching can suffer if the region is too large, too small, or does not fully contain the template image.

Approximate matching may be used to improve performance over exhaustive matching between every template image with a test image. In this approach, the set of all feature points from every template image are combined into a single, large feature descriptor. In some preferred embodiments hereof, FLANN matching may be used to find the N (e.g., N=10) best matching template image feature points for each test image feature point. The match results are used to increment a counter for each template image, or related set of template images, when a match is found between the test image and a template image. This scoring system uses the counters with the largest values to indicate the template images that are most likely to match the test image. In some preferred embodiments hereof, the template images associated with the largest N (e.g., N=10) counter values are matched against the region in the test image to find a match.

Multiple localization methods may be employed to use this matching technique on regions of interest in a test image. In some preferred embodiments hereof, these localization methods may be or comprise a global filter, region filter, or segmentation filter. Each filter describes one or more regions of the image to consider, and approximate matching may be used to generate a list of template images that may be found in each area. A global localization filter uses the feature points from the entire image that remain after removing feature points using the texture filter and non-matching region filter. The global filter is useful when the test image contains no more than a single representation of a template image.

Figure 8:
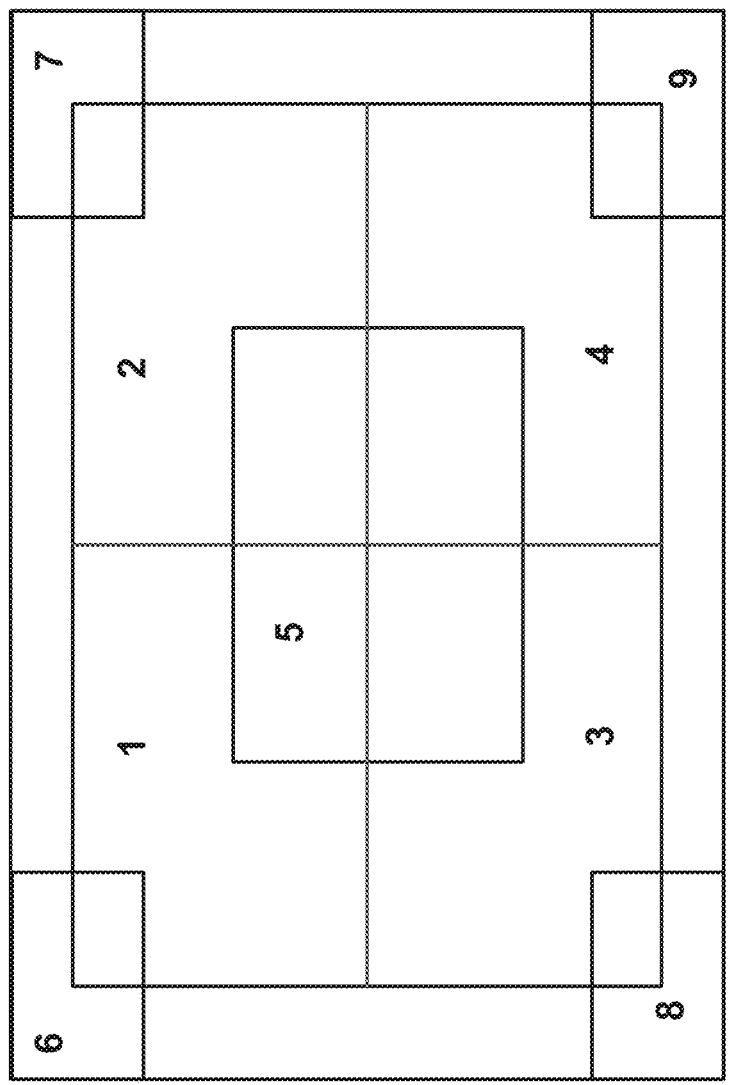
FIG. 8 shows an exemplary configuration of dividing an image into a number of sub-images according to exemplary embodiments hereof.

The region filter operates on either fixed or dynamic regions of the image. A fixed region filter divides the image into a set of N sub-regions where each sub-region is independently analyzed using either exhaustive search with the template images or against a subset of template images determined by the approximate match scoring system. The sub-regions may be overlapping and may be chosen to maximize the chances of detecting small features. FIG. 8 shows one exemplary configuration of dividing an image into a number of sub-images. The first four sub-images (1, 2, 3, and 4) each cover a quarter of the image, minus a small border around the image. The border area is not considered because many images contain an embedded border around the image. The fifth region (5) is substantially the same size as the first four regions but is centered in the image. The remaining four sub-images (6, 7, 8, and 9) cover the corners of the image, a common location where overlaid text, images, and watermarks are displayed. More complicated arrangements can also be employed, such as a 3×3 grid or an 8×8 grid overlaid on the image.

The dynamic region filter predicts which template images to search for in a region. The process begins by computing the N nearest-neighbor matches between the feature points in a test image and the feature points in each template image. For each feature point in the test image, a counter associated with each template image is incremented when the nearest-neighbor computation indicates a match. A list of candidate matches may be determined by looking for peaks in the matching data over a region in the image. This region may be fixed, or determined by where the peaks exist for each template image. Template images are discarded from further consideration when a template image has few peaks over any region in the test image.

The segmentation filter utilizes segmentation algorithms designed to find objects within images. The advantage of these filters is they avoid using a sliding-window approach to search every location in an image for an object. The segmentation algorithm produces a few hundred or a few thousand regions that may fully contain an arbitrary object. Algorithms to segment an image include selective search (e.g., van de Sande, et al, "Segmentation as Selective Search for Object Recognition," 2011 IEEE International Conference on Computer Vision, the entire contents of which are hereby fully incorporated herein by reference for all purposes) and objectness (e.g., Cheng et al, "BING: Binarized Normed Gradients for Objectness Estimation at 300 fps," IEEE CVPR, 1-8, 2014, the entire contents of which are hereby fully incorporated herein by reference for all purposes). For each proposed sub-image from a segmentation algorithm, the process proceeds in the same manner as the region filter.

The previous steps determine one or more regions of a test image and a list of template images to match against each region. The method of matching a first image against a second image is described above (and in provisional patent application No. 62/022,592, filed Jul. 9, 2014, and U.S. application Ser. No. 14/745,353, filed Jun. 19, 2015, the entire contents of each of which are fully incorporated herein by reference for all purposes). When the steps in this patent generate a single region that encompasses the entire image, and the list of template images is the entire set of template images, the processing is the same as described above (and in provisional patent application No. 62/022,592 and in U.S. application Ser. No. 14/745,353, filed Jun. 19, 2015).

DETAILED DESCRIPTION

Figure 4A:
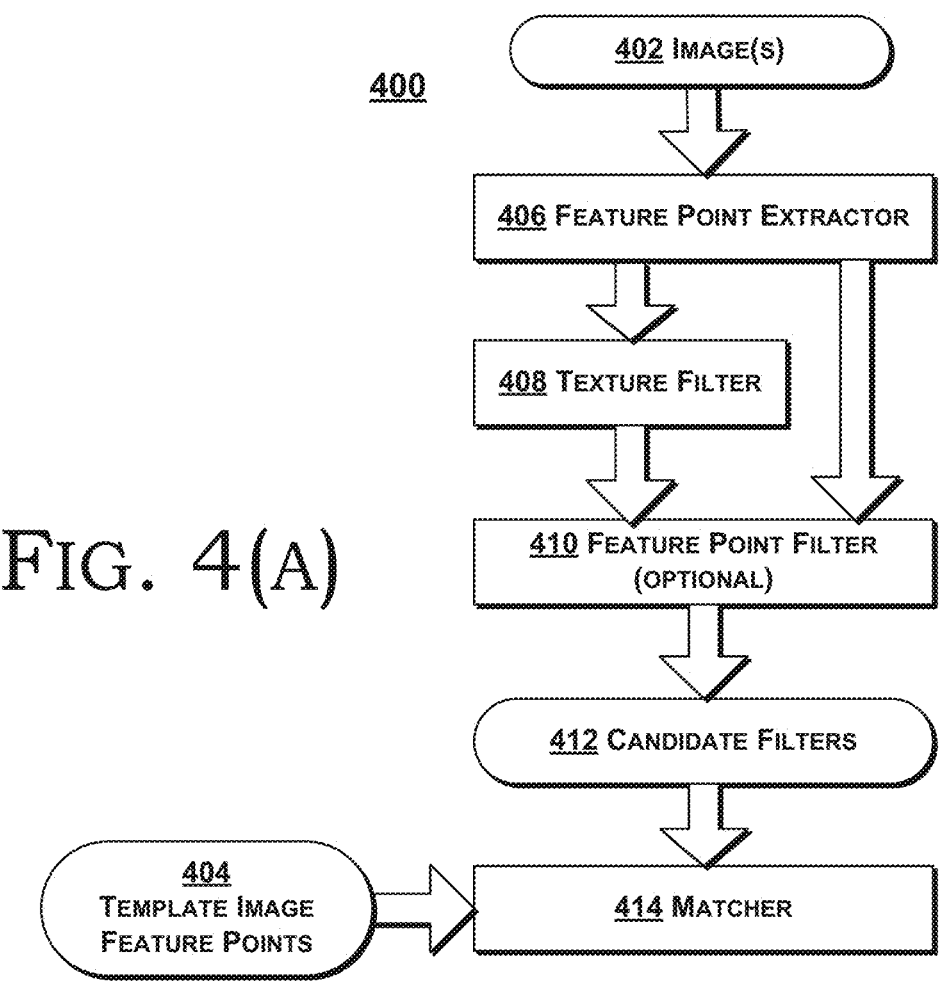
FIGS. 4(a)-4(b) are block diagrams illustrating aspects a system according to embodiments hereof.
Figure 4B:
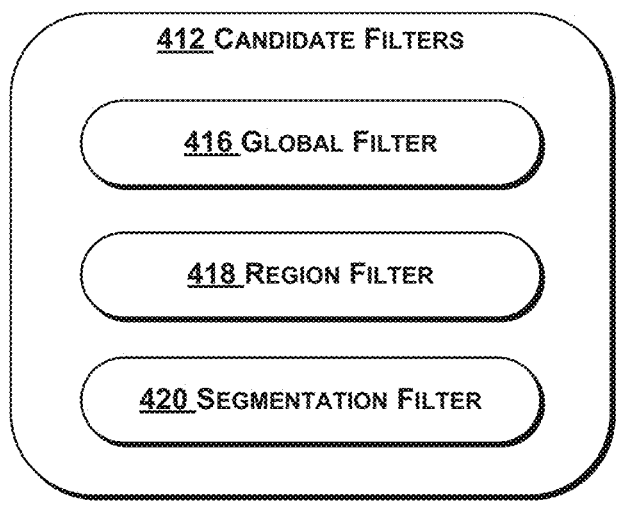

FIG. 4(A) is a block diagram illustrating aspects a system 400 according to embodiments hereof of improving matching by filtering and feature localization from image 402 against one or more template image feature points 404.

Feature point extractor 406 accepts one of more images 402 and computes or determines the feature points for each image. Feature points describe the visual content of images and may be generated at predetermined locations in an image, or computed from features found in an image. In preferred embodiments hereof, feature points may be generated using a SIFT-like feature detector to locate keypoints in an image, followed by computing feature descriptors at these keypoint locations. Images 402 may be gray-scale or multi-channel images. When images 402 contain multiple color channels, the extracted feature points may be based on a gray-scale representation of the image, any and all color channels, and images derived from images 402. In preferred embodiments hereof, an RGB color image is converted into separate images representing luminance (Y), (R-Y), and (B-Y).

Texture filter 408 accepts the feature point information generated by feature point extractor 406 from images 402 to remove feature points which are classified as texture (i.e., feature points that take no role in the matching of the feature points from image 402 with the feature points from template images 404). When the template images 404 consist of brand logos, unwanted texture may include, e.g., image noise, background scenes including grass, trees, sand, and sky, as well as text overlaid on the images. A region surrounding each feature point may be used to generate a set of texture models. The first texture model is generated at the location and size of each feature point, and in preferred embodiments hereof is a rectangular region. Additional texture models are generated at the same location but at a variety of scales to find the best scale of any contained texture. Comparing texture regions may use any comparison operation, including descriptor matching and normalized correlation. Descriptor matching uses the feature descriptors computed by feature point extractor 406, as well as descriptors generated for the generated set of texture models. The texture model descriptors associated with each feature point are compared to the texture model descriptors of every other feature point by computing the L2 distance between any two descriptors. Preferably the feature descriptors are normalized to unit length and the distance measure is a numeric value between 0 and 1. The distance information from each comparison is compared to find a set of descriptors, including scale, that appear similar. Similar feature descriptors can be treated individually or as a set. In preferred embodiments hereof, a minimum number of matching feature descriptors must be found before they are considered to be similar. This threshold is chosen such that similar, repetitive, feature points found in template images are not discarded before matcher 414 runs. When similar feature points are treated as a set, the region that encloses these descriptors is computed. This region may contain holes if there are non-matching feature points contained in this region. The region information, along with the original color image, may be used to verify a texture is present. Verification may use any suitable technique to verify the texture in the region is similar, including color histograms (e.g., Krstinić, D., et al "Fast two-step histogram-based image segmentation," Image Processing, IET Vol. 5, Issue 1, February 2011, pp. 63-72, the entire contents of which are hereby fully incorporated herein by reference for all purposes) and image segmentation (e.g., Chen et al "Adaptive Perceptual Color-Texture Image Segmentation," IEEE Trans. on Image Processing, Vol. 14, Issue 10, pgs. 1524-1536, October 2005, the entire contents of which are hereby fully incorporated herein by reference for all purposes). When normalized correlation is used for texture filter 408, the model images are chosen using the same methodology as descriptor matching. Rectangular regions surrounding the feature points are chosen, using the original location of a feature point as the center, and a variety of scales. The search process is similar to feature tracking (see, e.g., Lewis, J. P. "Fast Normalized Cross-Correlation," Industrial Light & Magic, Vision interface, 1995 (http://scribblethink.org/Work/nvisionInterface/nip.html), the entire contents of which are hereby fully incorporated herein by reference for all purposes) except that regions of the same image are compared, rather than sequential images from a video. When a potential region of similar texture is found, the same processing steps used for descriptor matching are used. Text is a special case of texture, especially when the text is machine generated or added as caption text on an image. Text usually contains similar edge, gradient, intensity, and color information. With a small modification, the processing steps of texture filter 408 may be used to detect text regions. When the potential texture regions are generated, they usually contain holes because the texture is not uniform throughout the text region. An alternate verification step may be used to see if the region contains text by looking for multiple potential texture regions that overlap each other. For example, one texture region might contain the similar edge boundaries from individual letters, and a second texture region might contain other similar edge boundaries or the background fill color/texture of the letters. The amount of overlap of multiple texture regions may be used to discard all feature points found within the intersection, or union, of the regions. The output from texture filter 408 is a modified list of feature points that were generated by feature point extractor 406. Feature points corresponding to regions of texture have been removed.

Feature point filter 410 accepts the list of feature points from feature point extractor 406 as modified by texture filter 408. During an offline training step, feature point information for matching feature points and non-matching feature points from previously analyzed images are used to divide feature points into three categories; feature points that are likely to be successful in matching an unknown image, feature point that are not likely to be successful in matching an unknown image, and feature points that cannot be labeled in either category. In practice, the only category considered are feature points that are not likely to be used for matching against any template image feature points 404. These feature points are excluded from further consideration because they are not similar to the feature points in any template image. The training process starts by collecting feature points from a collection of previously analyzed images. The feature points that are matched to a template image, or are in a small neighborhood surrounding the location of the template image, are counted as positive feature points. Nearby feature points are counted as positive feature points because these points might not match the template image due to effects such as distortion, blur, and image transformation. Negative feature points are all other points in an image that were not matched to a template image, and further filtered by similarity to other template images. Any feature point from an image that is similar to a feature point from any template image is classified as a positive feature point. The similarity measure used is L2 distance between the feature descriptors.

During normal matching of two images, the use of an absolute threshold to discard points from consideration can eliminate valid matching points, and such a scheme is usually discouraged. In this case, a suitable high distance threshold is chosen (0.7 or higher) such that potentially matching points are not considered as negative feature points. The collection of positive feature descriptors and negative feature descriptors are the training input to a classifier to predict which feature descriptors can be eliminated from further consideration. When the feature descriptor is a SIFT descriptor, each descriptor is a 420-dimensional vector. Suitable classification methods include training an SVM model, and K-means clustering (K=2). In preferred embodiments hereof, a linear SVM model is trained, biased to retain feature points that are near the decision boundary. The output from feature point filter 410 is a modified list of feature points that were generated by feature point extractor 406, and usually discards a small fraction of the feature points. See, Su, et al., "Evaluating The Quality Of Individual Sift Features," IEEE, ISIP 2012, the entire contents of which are hereby fully incorporated herein by reference for all purposes.

Candidate filter 412 attempts to localize feature points and predict what template images may be present in the image, and in some cases, where to search for the template images. The candidate filters differ on how the feature points are spatially localized, but the underlying ranking method is very similar. Given a set of feature points produced by feature point extractor 406, and modified by filters such as texture filter 408 and feature point filter 410, the feature points are compared with a known set of template image feature points 404 derived from a set of template images. IFP(k) represents the k-th feature point from image I produced by feature point extractor 406 and filtered by texture filter 408 and feature point filter 410. If TI(i) is the i-th template image, the feature points, including feature descriptors, for any template image can be expressed as TIPF(i, j) where i represents the template image index, and j indicates the feature point index from TI(i). The ranking step computes the N nearest-neighbor points from each IFP(k) to the feature points TIFP(i, j). A counter R(i) is initialized to zero where there is one counter for each template image TI(i). In preferred embodiments hereof, each template image is a single brand logo, and a set of brand logos describe a brand. In this configuration, there is one counter R(i) for each set of brand logos. For each nearest-neighbor match between IFP(k) and TIFP(i, j), a counter R(i) is incremented to indicate a possible match. The number of nearest neighbor points (N) to compute for each IFP(k) depends upon the number of template images used, the type of matching employed, and the expected number of matches in an image. In preferred embodiments hereof, an approximate nearest-neighbor matching algorithm such as FLANN may be used (see http://www.cs.ubc.ca/research/flann) to find the 10 nearest neighbor matching points from TIFP(i, j) for each IFP(k). The counters, R(i), are ranked from largest to smallest value. The output of the ranking method is the list of M template images, or set of template images, with the largest counter values. In preferred embodiments hereof, M=10. In general, template images that are not ranked in the top M results are discarded, and these template images do not participate in matcher 414.

A first candidate filter is global filter 126, which considers all the feature points computed by feature point extractor 406 and modified by filtering steps that can include texture filter 408 and feature point filter 410. IFP(k) consists of all the input feature points to candidate filters 412. The ranking method produces a list of the best M template images, or template image sets, that matcher 414 should use. The global filter 126 is useful when an image 402 is expected to contain no more than a few instances of one or more template images.

A second candidate filter is region filter 418 which converts the incoming feature points, IFP(k) into many smaller sets of feature points selected from IFP(k). Each subset of feature points is IFPS(s, k) where s indicates the subset s, and k indicates the feature point index from I. It is possible that the same feature point IFP(k) can be found in multiple subsets. The subset of points to use can be fixed or dynamically generated. An example of fixed region subsets is shown in FIG. 8, where the image is divided into nine (9) sub-images. For fixed regions, the locations may be determined based upon where most matches have been observed. The feature points found in each sub-image are collected into IFPS(s, k). For regions with very few points, no further processing is performed. In preferred embodiments hereof, the ranking method is only computed for sub-images with greater than a threshold number of (e.g., 12) feature points. For each sub-image where ranking is performed, the results produced by region filter 418 is a list of sub-images, along with the highest M ranking template images for each sub-image. A dynamically generated region filter may use a modified ranking method to determine sub-images of image 402 that might contain a template image. The modified ranking method begins by initializing a counter IR(k, i) to zero to each feature point, IFP(k), in image 402. IR(k, i) is incremented for the best Q matches between TIFP(i, j) and IFP(k). In preferred embodiments hereof, the best two (2) approximate nearest-neighbor matches between TIFP(i, j) and IFP(k) are determined. When the matching is performed between every feature point for all template images, the counter IR(k, i) is ranked from largest to smallest to identify the best template image TI(i) for each feature point IFP(k). When a counts IR(k, i) are considered for a sub-region of feature points from I, the best template images are identified that have peaks in multiple places in the sub-region. In preferred embodiments hereof, Q=2, and a small rectangular region is moved across the image I to find regions, and a list of template images, that have consistent peaks in IR(k, i). The size of the sliding window is increased to find sub-regions of image I that may match one or more template images. These ranking results are not used further, as only the size and location of the rectangular regions that may contain matches are retained. At this point, the dynamic filter operates like a fixed region filter, using the size and location of rectangular regions to determine which template images may be found in each sub-region.

Another candidate filter is segmentation filter 420 which utilizes other segmentation means to divide an image 402 into a number of sub-images, where each sub-image represents a region that surrounds a feature in the image. The identified feature may or may not match a template image, but these filters are designed to produce a modest number of regions (1000-3000) that surround greater than 90% of objects. An additional step of non-maximal suppression may be applied to the region list returned by the segmentation filter to remove nearly identical overlapping regions. In preferred embodiments hereof, a greedy form of non-maximal suppression may be used and regions with an overlap, expressed as intersection-over-union, of 0.8 are removed. (See, e.g., Arbeláez et al "Semantic Segmentation using Regions and Parts," 2012 IEEE Conference on Computer Vision and Pattern Recognition (CVPR), 16-21 Jun. 2012, pgs. 3378-3385, the entire contents of which are hereby fully incorporated herein by reference for all purposes.)

The regions that remain after non-maximal suppression are processed in the same manner as regions generated by the region filter 418. The output from the segmentation filter 420 is a list of sub-regions of the image, and a list of template images that are potential matches in each sub-region.

Matcher 414 takes one or more sets of feature points extracted from images 402 and generated by feature point extractor 406. These feature points can be modified by filters that include texture filter 408, feature point filter 410, and candidate filters 412. In a simplest form, matcher 414 is passed a single set of feature points generated from image 402, and a list of template image feature points 404. For each set of template image feature points, matcher 414 will determine if a representation of template image TI(i) is found in Image I, using feature points IFP(k) and TIFP(k, i). Any form of feature point matching can be used, but in preferred embodiments hereof, the matcher operates as described in U.S. patent application No. 62/022,592, filed Jul. 9, 2014 and in U.S. patent application Ser. No. 14/745,353, filed Jun. 19, 2015 (the entire contents of which are hereby fully incorporated herein by reference for all purposes), and uses brute-force matching to identify matching template images in image 402. Matcher 414 may also be passed an array of images, each with a set of feature points to match against template image feature points 404. Multiple sets of feature points can be generated by candidate filters 412 in an attempt to localize the feature points to regions where a template image is expected. This is especially important when an image contains multiple instances of the same template image. When image 402 is partitioned in such a way as to help divide the multiple matching regions into separate sets of feature points, the matching process is greatly simplified and removes the ambiguity of matching a template image against a number of matching regions in image 402. The output of matcher 414 is the location, orientation, and identity of each template image found in image 402.

Application of Techniques

The framework, system, techniques and mechanisms described herein have general applicability. However, in a presently preferred implementation the template images comprise logos and the like corresponding to products (e.g., goods and services) related to certain companies or other entities.

As used herein a logo refers to any symbol, image, text, or other design, or combination thereof, adopted or used by an entity to identify its products, goods, services, etc.

In some cases the system may use multiple versions of the same logo (e.g., at different sizes).

In operation multiple test images in one or more input streams are processed with respect to multiple logos from multiple entities.

Computing

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

Figure 5:
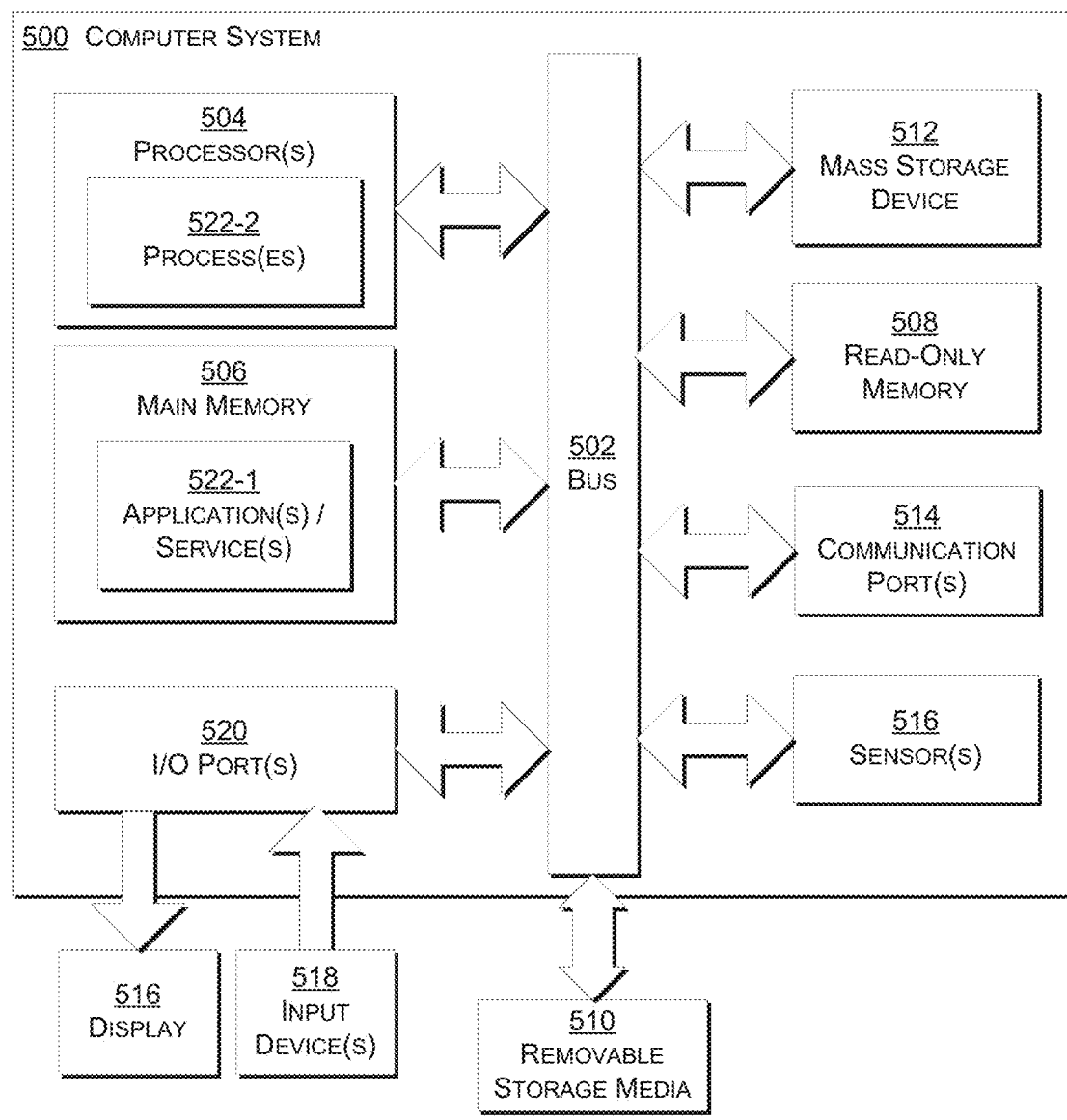
FIG. 5 is a schematic diagram of a computer system.

FIG. 5 is a schematic diagram of a computer system 500 upon which embodiments of the present disclosure may be implemented and carried out.

According to the present example, the computer system 500 includes a bus 502 (i.e., interconnect), one or more processors 504, one or more communications ports 514, a main memory 506, removable storage media 510, read-only memory 508, and a mass storage 512. Communication port(s) 514 may be connected to one or more networks by way of which the computer system 500 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 504 can be (or include) any known processor, such as, but not limited to, an Intel® Itanium® or Itanium 2® processor(s), AMD® Opteron® or Athlon MP® processor(s), or Motorola® lines of processors, and the like. Processor(s) may include one or more graphical processing units (GPUs) which may be on graphic cards or stand-alone graphic processors.

Communications port(s) 514 can be any of an RS-232 port for use with a modem based dial-up connection, a 10/100 Ethernet port, a Gigabit port using copper or fiber, or a USB port, and the like. Communications port(s) 514 may be chosen depending on a network such as a Local Area Network (LAN), a Wide Area Network (WAN), a CDN, or any network to which the computer system 500 connects. The computer system 500 may be in communication with peripheral devices (e.g., display screen 516, input device(s) 518) via Input/Output (I/O) port 520. Some or all of the peripheral devices may be integrated into the computer system 500, and the input device(s) 518 may be integrated into the display screen 516 (e.g., in the case of a touch screen).

Main memory 506 can be Random Access Memory (RAM), or any other dynamic storage device(s) commonly known in the art. Read-only memory 508 can be any static storage device(s) such as Programmable Read-Only Memory (PROM) chips for storing static information such as instructions for processor(s) 504. Mass storage 512 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 502 communicatively couples processor(s) 504 with the other memory, storage and communications blocks. Bus 502 can be a PCI/PCI-X, SCSI, a Universal Serial Bus (USB) based system bus (or other) depending on the storage devices used, and the like. Removable storage media 510 can be any kind of external hard-drives, floppy drives, IOMEGA® Zip Drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 506 is encoded with application(s) 522 that support(s) the functionality as discussed herein (an application 522 may be an application that provides some or all of the functionality of one or more of the mechanisms described herein). Application(s) 522 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 504 accesses main memory 506 via the use of bus 502 in order to launch, run, execute, interpret or otherwise perform the logic instructions of the application(s) 522. Execution of application(s) 522 produces processing functionality of the service(s) or mechanism(s) related to the application(s). In other words, the process(es) 524 represents one or more portions of the application(s) 522 performing within or upon the processor(s) 504 in the computer system 500.

It should be noted that, in addition to the process(es) 524 that carries(carry) out operations as discussed herein, other embodiments herein include the application 522 itself (i.e., the un-executed or non-performing logic instructions and/or data). The application 522 may be stored on a computer readable medium (e.g., a repository) such as a disk or in an optical medium. According to other embodiments, the application 522 can also be stored in a memory type system such as in firmware, read only memory (ROM), or, as in this example, as executable code within the main memory 506 (e.g., within Random Access Memory or RAM). For example, application 522 may also be stored in removable storage media 510, read-only memory 508, and/or mass storage device 512.

Those skilled in the art will understand that the computer system 500 can include other processes and/or software and hardware components, such as an operating system that controls allocation and use of hardware resources.

Embodiments herein may be provided as a computer program product, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

Those skilled in the art will understand that the computer system 700 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of skill in the art will appreciate that the process may operate without any user intervention. In another embodiment, the process includes some human intervention (e.g., a step is performed by or with the assistance of a human).

Real Time

Those of ordinary skill in the art will realize and understand, upon reading this description, that, as used herein, the term "real time" means near real time or sufficiently real time. It should be appreciated that there are inherent delays in network-based and computer communication (e.g., based on network traffic and distances), and these delays may cause delays in data reaching various components. Inherent delays in the system do not change the real-time nature of the data. In some cases, the term "real-time data" may refer to data obtained in sufficient time to make the data useful for its intended purpose. Although the term "real time" may be used here, it should be appreciated that the system is not limited by this term or by how much time is actually taken to perform any particular process. In some cases, real time computation may refer to an online computation, i.e., a computation that produces its answer(s) as data arrive, and generally keeps up with continuously arriving data. The term "online" computation is compared to an "offline" or "batch" computation.

Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, whether in the written description or the claims, "plurality" means two or more.

As used herein, whether in the written description or the claims, the terms "comprising", "including", "having", "containing", "involving", and the like are to be understood to be open-ended, that is, to mean including but not limited to. Only the transitional phrases "consisting of" and "consisting essentially of", respectively, are closed or semi-closed transitional phrases with respect to claims.

As used herein, "and/or" means that the listed items are alternatives, but the alternatives also include any combination of the listed items.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the terms "first", "second", "third," and so on, if used in the claims, are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering. Specifically, use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The foregoing is merely illustrative and not limiting, having been presented by way of example only. Although examples have been shown and described, it will be apparent to those having ordinary skill in the art that changes, modifications, and/or alterations may be made.

Thus is provided a framework for finding template images in test or target images.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

We claim:

1. A tangible, non-transitory, machine-readable medium storing instructions that when executed by one or more processors of a computing system effectuate operations comprising:

obtaining a first image depicting an object;
extracting a first set of feature points from the first image with operations comprising:
  determining locations of one or more keypoints in the first image, wherein each of the one or more keypoints describes a two-dimensional (2D) coordinate location and orientations of each feature point from the first set of feature points in the first image, and
  computing first feature descriptors at each of the one or more keypoints, wherein each descriptor of the first feature descriptors comprises at least 128 values characterizing orientations in a region surrounding each of the one or more keypoints;
generating a set of repeating pattern models using a region surrounding each feature point from the first set of feature points;
computing second feature descriptors for each repeating pattern model of the set of repeating pattern models;
computing a distance between any two feature descriptors selected from the first feature descriptors and the second feature descriptors;
determining that a set of descriptors are similar to one another by comparing the distance computed between each of the two feature descriptors to one or more thresholds;
determining that the set of descriptors comprises a minimum number of matching feature descriptors; and
designating regions of the first image comprising feature points associated with the set of descriptors as repeating patterns.

2. The medium of claim 1, wherein the distance is an L2 distance and the operations further comprise:
determining an amount of overlap between two or more of the regions;
determining the feature points located within a portion of the two or more of the regions that overlap; and
generating a set of feature points to be removed from the first set of feature points, wherein the set of feature points comprises the feature points located within the portion.

3. The medium of claim 1, wherein the operations further comprise:
collecting, prior to the first image being obtained, feature points from a collection of previously analyzed images;
determining, from the feature points collected from the collection of previously analyzed images, positive feature points and negative feature points, wherein the positive feature points comprise feature points that are matched to a template image or that are determined to be nearby to the positive feature points, and wherein negative feature points comprise feature points not matched to a template image;
training a classifier to identify feature descriptors within an image based on the positive feature points and the negative feature points;
generating, based on the classifier being applied to the first set of feature points, a set of feature points to be removed from the first set of feature points, wherein the feature points identified as the repeating patterns comprise at least one feature point from the set of feature points; and
generating a second set of feature points by removing the first set of feature points and not removing the at least one feature point from the set of feature points.

4. The medium of claim 1, wherein the operations further comprise:

generating a second set of feature points by removing, from the first set of feature points, the feature points associated with the set of descriptors;

comparing the second set of feature points with a set of template image feature points, wherein each template image feature point from the set of template image feature points is obtained from a corresponding template image of a plurality of template images and is used to determine one or more nearest neighbor points;

initializing a corresponding counter for each of the plurality of template images incrementing or decrementing the corresponding counter for each of the one or more nearest neighbor points indicating a possible match between the corresponding template image and the first image;

ranking each corresponding counter to obtain a list of counters; and determining whether the first image comprises one or more of the plurality of template images based on a rank of the corresponding counter associated with the corresponding template image.

5. The medium of claim 1, wherein the operations further comprise:
steps for detecting textures.

6. The medium of claim 1, wherein the operations further comprise:
steps for detecting repeating patterns.

7. The medium of claim 1, wherein the operations further comprise:
steps for detecting text.

8. A tangible, non-transitory, machine-readable medium storing instructions that when executed by one or more processors of a computing system effectuate operations comprising:

obtaining, with one or more processors, a plurality of test images;

extracting, with one or more processors, features from respective test images to form respective test feature sets;

obtaining, with one or more processors, a given image depicting an object for which a search is to be conducted among the plurality of test images to determine a subset of the plurality of test images that depict objects that are determined to be similar to the object depicted in the given image;

extracting, with one or more processors, features from the given image to form a given feature set, the given feature set comprising scale invariant features;

detecting, with one or more processors, a pattern in the given image based on at least part of the given feature set;

determining, with one or more processors, based on the detected pattern, the given feature set, and the respective test feature sets, which of the plurality of test images depict objects that appear similar to the object depicted in the given image to form a subset of the plurality of test images; and storing, with one or more processors, identifiers of the subset of the plurality of test images in memory.

9. The medium of claim 8, wherein:
detecting the pattern is performed with steps for looking for repeating patterns in an image; and
the subset of the plurality of test images are determined in real time after obtaining the given image.

10. The medium of claim 8, comprising:
detecting a non-repeating texture in the given image based on the given feature set, wherein the subset of the plurality of test images is determined based on both the detected pattern and the detected texture.

11. The medium of claim 10, wherein:
determining the subset of the plurality of test images comprises selecting a subset of features in the given feature set that exclude features corresponding to the detected texture and features corresponding to the detected pattern; and the subset of the plurality of test images based on which features of the given feature set are among the selected subset of features and which features of the given feature set are not among the selected subset of features.

12. A method, comprising:
obtaining a first image depicting an object;

extracting a first set of feature points from the first image with operations comprising:
determining locations of one or more keypoints in the first image, wherein each of the one or more keypoints describe a two-dimensional (2D) coordinate location and orientations of each feature point from the first set of feature points in the first image, and computing first feature descriptors at each of the one or more keypoints, wherein each descriptor of the first feature descriptors comprises at least 128 values characterizing orientations in a region surround each of the one or more keypoints;

generating a set of repeating pattern models using a region surrounding each feature point from the first set of feature points;

computing second feature descriptors for each repeating pattern model of the set of repeating pattern models;

computing a distance between any two feature descriptors selected from the first feature descriptors and the second feature descriptors;

determining that a set of descriptors are similar to one another by comparing the distance computed between each of the two feature descriptors to one or more thresholds;

determining that the set of descriptors comprises a minimum number of matching feature descriptors; and designating regions of the first image comprising feature points associated with the set of descriptors as repeating patterns.

13. The method of claim 12, wherein the distance is an L2 distance and the operations further comprise:
determining an amount of overlap between two or more of the regions;

determining the feature points located within a portion of the two or more of the regions that overlap; and generating a set of feature points to be removed from the first set of feature points, wherein the set of feature points comprises the feature points located within the portion.

14. The method of claim 12, wherein the operations further comprise:
collecting, prior to the first image being obtained, feature points from a collection of previously analyzed images;

determining, from the feature points collected from the collection of previously analyzed images, positive feature points and negative feature points, wherein the positive feature points comprise feature points that are matched to a template image or that are determined to be nearby to the positive feature points, and wherein negative feature points comprise feature points not matched to a template image;

training a classifier to identify feature descriptors within an image based on the positive feature points and the negative feature points;

generating, based on the classifier being applied to the first set of feature points, a set of feature points to be removed from the first set of feature points, wherein the feature points identified as the repeating patterns comprise at least one feature point from the set of feature points; and generating a second set of feature points by removing the first set of feature points and not removing the at least one feature point from the set of feature points.

15. The method of claim 12, wherein the operations further comprise:

generating a second set of feature points by removing, from the first set of feature points, the feature points associated with the set of descriptors;

comparing the second set of feature points with a set of template image feature points, wherein each template image feature point from the set of template image feature points is obtained from a corresponding template image of a plurality of template images and is used to determine one or more nearest neighbor points;

initializing a corresponding counter for each of the plurality of template images incrementing or decrementing the corresponding counter for each of the one or more nearest neighbor points indicating a possible match between the corresponding template image and the first image;

ranking each corresponding counter to obtain a list of counters; and determining whether the first image comprises one or more of the plurality of template images based on a rank of the corresponding counter associated with the corresponding template image.

16. The method of claim 12, wherein the operations further comprise:

steps for detecting textures.

17. The method of claim 12, wherein the operations further comprise:

steps for detecting repeating patterns.

18. The method of claim 12, wherein the operations further comprise:

steps for detecting text.

19. A method, comprising:

obtaining, with one or more processors, a plurality of test images;

extracting, with one or more processors, features from respective test images to form respective test feature sets;

obtaining, with one or more processors, a given image depicting an object for which a search is to be conducted among the plurality of test images to determine a subset of the plurality of test images that depict objects that are determined to be similar to the object depicted in the given image;

extracting, with one or more processors, features from the given image to form a given feature set, the given feature set comprising scale invariant features;

detecting, with one or more processors, a repeating pattern in the given image based on at least part of the given feature set;

determining, with one or more processors, based on the detected pattern, the given feature set, and the respective test feature sets, which of the plurality of test images depict objects that appear similar to the object depicted in the given image to form a subset of the plurality of test images; and storing, with one or more processors, identifiers of the subset of the plurality of test images in memory.

20. The method of claim 19, wherein:

detecting the repeating pattern is performed with steps for looking for repeating patterns in an image; and the subset of the plurality of test images are determined in real time after obtaining the given image.

21. The method of claim 19, comprising:

detecting a non-repeating texture in the given image based on the given feature set;

wherein the subset of the plurality of test images is determined based on both the detected pattern and the detected texture.

22. The method of claim 21, wherein:

determining the subset of the plurality of test images comprises selecting a subset of features in the given feature set that exclude features corresponding to the detected texture and features corresponding to the detected pattern; and the subset of the plurality of test images based on which features of the given feature set are among the selected subset of features and which features of the given feature set are not among the selected subset of features.

* * * * *